(12) United States Patent
Yoon et al.

(10) Patent No.: US 12,014,283 B2
(45) Date of Patent: Jun. 18, 2024

(54) SYSTEMS AND METHODS FOR IDENTIFYING PROCESS FLOWS FROM LOG FILES AND VISUALIZING THE FLOW

(71) Applicant: Oracle International Corporation, Redwood Shores, CA (US)

(72) Inventors: Jae Young Yoon, San Mateo, CA (US); Dhileeban Kumaresan, Telangana (IN); Venktesh Alvenkar, Telangana (IN); Sreeji Das, Fremont, CA (US); Harish Akali, Acton, MA (US); Hari Krishna Galla, Telangana (IN)

(73) Assignee: Oracle International Corporation, Redwood Shores (CA)

( * ) Notice: Subject to any disclaimer, the term of this patent is extended or adjusted under 35 U.S.C. 154(b) by 912 days.

(21) Appl. No.: 15/610,388

(22) Filed: May 31, 2017

(65) Prior Publication Data
US 2018/0113578 A1   Apr. 26, 2018

Related U.S. Application Data

(63) Continuation of application No. 15/610,200, filed on May 31, 2017.
(Continued)

(51) Int. Cl.
*G06N 5/04*     (2023.01)
*G06F 3/0481*   (2022.01)
(Continued)

(52) U.S. Cl.
CPC ............. *G06N 5/04* (2013.01); *G06F 3/0481* (2013.01); *G06F 3/0482* (2013.01);
(Continued)

(58) Field of Classification Search
CPC ....... G06N 5/04; G06F 16/285; G06F 40/205; G06Q 10/0633; H04L 43/045; H04L 43/067
See application file for complete search history.

(56) References Cited

U.S. PATENT DOCUMENTS 7,912,946 B2   3/2011   Sengupta et al.
8,381,193 B2   2/2013   Cervantes
(Continued)

FOREIGN PATENT DOCUMENTS

CN   1604035 A    4/2005
CN   105653444 A   6/2016
(Continued)

OTHER PUBLICATIONS

Vahi et al., "A General Approach to Real-time Workflow monitoring", 2012 SC Companion: High Performance Computing, Networking Storage and Analysis. (Year: 2012).*
(Continued)

*Primary Examiner* — Alexey Shmatov
*Assistant Examiner* — Beatriz Ramirez Bravo
(74) *Attorney, Agent, or Firm* — Mughal Gaudry & Franklin PC

(57) ABSTRACT

The present disclosure relates to identifying process flows from log sources (e.g., log files), and generating visual representations (e.g., flow diagrams, Sankey diagrams, etc.) of the identified process flows. In addition, the present disclosure relates to clustering of tree structures based on the shape of the tree structure using one or more hashing algorithms. The present disclosure also relates to a user interface that presents a query builder for efficiently querying a log analytics system for tree structures that satisfy a user-defined range.

21 Claims, 15 Drawing Sheets

Related U.S. Application Data

(60) Provisional application No. 62/412,035, filed on Oct. 24, 2016.

(51) Int. Cl.

| | | |
|---|---|---|
| *G06F 3/0482* | (2013.01) | |
| *G06F 3/04847* | (2022.01) | |
| *G06F 16/28* | (2019.01) | |
| *G06F 16/335* | (2019.01) | |
| *G06F 16/338* | (2019.01) | |
| *G06F 16/35* | (2019.01) | |
| *G06F 40/205* | (2020.01) | |
| *G06Q 10/0633* | (2023.01) | |
| *H04L 41/12* | (2022.01) | |
| *H04L 43/045* | (2022.01) | |
| *H04L 43/067* | (2022.01) | |
| *G06N 20/00* | (2019.01) | |

(52) U.S. Cl.
CPC ........ *G06F 3/04847* (2013.01); *G06F 16/285* (2019.01); *G06F 16/335* (2019.01); *G06F 16/338* (2019.01); *G06F 16/35* (2019.01); *G06F 40/205* (2020.01); *G06Q 10/0633* (2013.01); *H04L 41/12* (2013.01); *H04L 43/045* (2013.01); *H04L 43/067* (2013.01); *G06N 20/00* (2019.01)

(56) References Cited

U.S. PATENT DOCUMENTS

| | | | |
|---|---|---|---|
| 8,504,995 B2 | 8/2013 | Neff | |
| 9,244,755 B2 | 1/2016 | Huang et al. | |
| 9,405,755 B1 | 8/2016 | Bailey et al. | |
| 9,519,698 B1 | 12/2016 | Lee et al. | |
| 10,861,202 B1* | 12/2020 | Agnew | G06F 16/904 |
| 2011/0029485 A1 | 2/2011 | Park et al. | |
| 2011/0185234 A1* | 7/2011 | Cohen | G06F 11/3476 |
| | | | 714/E11.029 |
| 2011/0225565 A1* | 9/2011 | van Velzen | G06Q 10/06 |
| | | | 717/114 |
| 2014/0143185 A1 | 5/2014 | Karan et al. | |
| 2014/0337069 A1 | 11/2014 | Gawande | |
| 2015/0106324 A1* | 4/2015 | Puri | G06F 11/079 |
| | | | 706/52 |
| 2015/0242431 A1 | 8/2015 | Vlcek | |
| 2015/0370842 A1* | 12/2015 | Gukal | G06F 11/3072 |
| | | | 707/726 |
| 2016/0063388 A1* | 3/2016 | Mizutani | G06F 11/3476 |
| | | | 706/52 |
| 2016/0110234 A1 | 4/2016 | Jeong et al. | |
| 2017/0039233 A1 | 2/2017 | Gauthier et al. | |
| 2017/0039491 A1 | 2/2017 | Gauthier et al. | |
| 2017/0180404 A1* | 6/2017 | Bersch | H04L 63/1433 |
| 2017/0357710 A1 | 12/2017 | Shtossel et al. | |
| 2018/0113578 A1 | 4/2018 | Yoon et al. | |
| 2018/0114126 A1 | 4/2018 | Das et al. | |
| 2019/0034517 A1* | 1/2019 | Byrd | G06F 17/40 |

FOREIGN PATENT DOCUMENTS

| | | |
|---|---|---|
| WO | 2016048283 A1 | 3/2016 |
| WO | 2018080840 | 5/2018 |

OTHER PUBLICATIONS

Gaaloul et al., "Log-based Transactional Workflow Mining", Springer Science+Business Media, Mar. 2009. (Year: 2009).*

Vaarandi et al., A Data Clustering Algorithm for Mining Patterns from Event Logs, IEEE, 2003. (Year: 2003).*

Abe, Mari, et al "Business Monitoring Framework for Process Discovery with Real-Life Logs", IBM Research—Tokyo, http://www.cs.columbia.edu/~vpappas/papers/cloudopsy.hci13.pdf 8 pages.

Zavou, Angeliki, et al "Cloudopsy: an Autopsy of Data Flows in the Cloud", http://fluxicon.com/blog/wp-content/uploads/2015/01/BPM2014-paper40-abe.pdf, 10 pages.

Ghelani, Ketan, "Announcing the new and improved Azure Log Analytics", Microsoft Azure, dated Aug. 9, 2017, accessed from the internet: https://azure.microsoft.com/en-us/blog/announcing-the-new-and-improved-azure-log-analytics/.

Kobielus, James, "Big data log analysis thrives on machine learning", InfoWorld, dated Jun. 18, 2014, accessed from the internet: https://www.infoworld.com/article/2608064/big-data/big-data-log-analysis-thrives-on-machine-learning.html.

International Application No. PCT/US2017/056944, International Search Report and Written Opinion mailed on Dec. 14, 2017, 14 pages.

PCT/US2017/056944 received an International Preliminary Report on Patentability mailed May 9, 2019, 11 pages.

U.S. Appl. No. 15/610,200, Non-Final Office Action mailed on Jul. 10, 2020, 50 pages.

U.S. Appl. No. 15/610,200, Final Office Action mailed Mar. 9, 2021, 57 pages.

European Patent Application No. 17795105.0, Office Action mailed Jan. 11, 2021, 10 pages.

U.S. Appl. No. 15/610,200 , Non-Final Office Action, mailed on Sep. 22, 2021, 60 pages.

U.S. Appl. No. 15/610,200 , Final Office Action, mailed on Jan. 21, 2022, 66 pages.

Fronza et al., "Failure Prediction Based On Log Files Using Random Indexing and Support Vector Machines", Journal of Systems and Softw are, vol. 86, Issue 1, Jun. 14, 2012, pp. 2-11.

U.S. Appl. No. 15/610,200 , Non-Final Office Action, Mailed On Aug. 23, 2022, 68 pages.

Chinese Application No. 201780065741.X, Office Action mailed on Dec. 5, 2022, 18 pages (8 pages of Original Document and 10 pages of English Translation).

U.S. Appl. No. 15/610,200, Final Office Action mailed on Feb. 13, 2023, 69 pages.

Notice of Allowance for U.S. Appl. No. 15/610,200, dated Feb. 14, 2024.

Office Action for Chinese Patent Application No. 201780065741.X, dated Nov. 29, 2023.

Notice of Allowance for Chinese Patent Application No. 201780065741.X, dated Dec. 19, 2023.

Non-Final Office Action for U.S. Appl. No. 15/610,200, dated Jun. 6, 2023.

Office Action for Chinese Patent Application No. 201780065741.X, dated Jul. 1, 2023.

* cited by examiner

SYSTEMS AND METHODS FOR IDENTIFYING PROCESS FLOWS FROM LOG FILES AND VISUALIZING THE FLOW

CROSS REFERENCE TO RELATED APPLICATIONS

This application is a continuation of U.S. Ser. No. 15/610,200, filed on May 31, 2017, which claims the priority benefit of U.S. Provisional Application No. 62/412,035, filed on Oct. 24, 2016, the disclosures of each of which are herein incorporated by reference in its entirety for all purposes.

TECHNICAL FIELD

The present disclosure relates to identifying process flows from log sources (e.g., log files), and generating visual representations (e.g., flow diagrams, Sankey diagrams, etc.) of the identified process flows.

BACKGROUND

Most business applications are structured as high-level business flows that include one or more stages of interactions between user devices and one or more servers. For example, a business flow can include a login stage for processing login credentials received from user devices, which proceeds to a validation stage for processing information received at input fields of a website, which then proceeds to a final checkout stage for completing a transaction. The flow of data between the various stages of the business flow is generally handled by software modules. These software modules may be executing on different servers, located in different networks. Further, the software modules are configured to perform various operations related to the corresponding stage of the business flow. Information about the operations can be logged in log files that include a log record for each transaction. The log records can be analyzed to identify failures in the business flow.

Existing solutions present data in a flat manner, where all metrics are treated equally, such that the user needs a great deal of knowledge about the system to make use of the data. Further, existing techniques require a great amount of expertise to make inferences from the data, viewed separately, and those inferences might not even be accurate.

SUMMARY

Certain aspects and features of the present disclosure relate to systems and methods for identifying process flows (e.g., a workflow including one or more stages) and displaying a visual representation of the identified process flows. In one embodiment, an interface can be provided that presents a visual representation (e.g., a flow diagram, a Sankey diagram, and other suitable diagrams) of a process flow. The interface can be configured to receive user input corresponding to a selection of a flow key for grouping two or more log records in different log files. For example, a flow key can be a unique identifier that identifies a particular transaction in the process flow. Further, the interface can facilitate the grouping of log records in various log files using the selected flow key. One or more log files can be generated during a process flow. The interface can display a visual representation of the grouped log records over one or more time intervals between a defined start time and a defined end time. The interface enables a user to select a time interval and presents the visual representation of the process flow for the selected time interval. In some instances, all of the log records from the one or more log files involved in the process flow during a particular time interval can be obtained. For example, if the value of a flow key (e.g., a transaction ID, a user ID and a session ID, etc.) of a first log record in a first log file is the same as the value of a flow key of a second log record in a second log file, then the first log record can be connected to the second log record. Further, once the connections between various log files using the flow key is completed, the connections are ordered in time to generate the process flow.

In another embodiment, log messages (used interchangeably with log records) can be automatically tracked through a workflow in a user-defined time period. Log messages are identified that correspond to a given time period (e.g., defined by a user) and, optionally, one or more other constraints. The interface can be configured to receive input corresponding to a selection of a set of messages to analyze, including characteristic-based subsets of messages that differ by some characteristic (e.g., source, message type, etc.), where messages of different characteristics tend to occur at different times even though the characteristic itself is not time-based. Further, the interface can be configured to receive an input corresponding to a selection of one or multiple variables to use as a flow key (e.g. transaction ID or (user ID, session ID)) to connect messages to each other across different characteristics, the flow key occurring in a first subset of messages with a first characteristic and a second subset of messages with a second characteristic (e.g., a login data subset to a checkout data subset). Either the user selects a length of a time interval (optionally one that is suggested to the user), or a time interval is selected for the user automatically. Then, the interface presents a visualization of the selected dataset where data in the same subsets are aggregated, and data in different subsets are shown sequentially on a relative timeline, and messages are connected between the different subsets and shown in an aggregate form representing how many messages connect between particular different subsets. For each iteration, a sequence is identified based on types of sequential log messages with associated with the identifier. The sequences are assessed to identify potential trajectories of each iteration. A workflow is defined that includes each potential trajectory. For example, a trajectory can include the one or more connections between different subsets. Quantities that represent a number (or percentage) of log messages that progressed along each trajectory are identified. A presentation of the workflow and quantities is facilitated.

In another embodiment, a computer-implemented method can be provided. The method can include receiving, via an interface, first input corresponding to a selection of a set of log messages; and accessing the set of log messages based on the received first input. The set of log messages can include a plurality of subsets of the set of log messages. Each subset of the set of log messages can correspond to a defined characteristic. The method can also include receiving second input that corresponds to a selection of a branching parameter configured to facilitate branching of one or more paths in a flow diagram representing the set of log messages. A first bucket of the flow diagram can be determined. For example, the first bucket can include all log messages of the set of log messages. One or more second buckets of the flow diagram can be determined. For example, each second bucket can represent a subset of the set of log messages. Each log message can included in the second bucket can correspond to a defined characteristic associated with the selected parameter. In addition, the method can include defining the one or more paths of the flow diagram. Each of the one or more paths can link the first bucket to a second bucket of the one or more second buckets. The method can include generating a graphical user interface (GUI) that includes a visual representation of the one or more paths of the flow diagram; and displaying the GUI including the visual representation. For example, the visual representation can include a path that visually and spatially connects the first bucket to a second bucket of the one or more second buckets.

In another embodiment, each workflow can be represented as a tree structure (or any suitable directed acyclic graph), with each node corresponding to a log-message type. A node may, but need not, be a branching node. A shape of each tree may be characterized. It can be determined whether shapes corresponding to different variables (e.g., time periods) match or are similar, and an indication of such can be identified in a presentation on a user interface. The shape clustering may include evaluating each of the node connections (e.g., first characteristic-based-subset to second characteristic-based-subset, e.g., a login data subset to a checkout data subset) that exist for a given tree structure (e.g., data set of the plurality of data sets), and clustering multiple different time-based intervals of the characteristic-based subsets based on their similarities. For example, a process flow for a particular time interval may represented by a tree structure including node A connected to each of node B and node C. The shape of the tree structure can be represented by the connections of node A to node B, and separately, node A to node C. The log analytics system can evaluate the tree structures for other time intervals to determine whether any other tree structures match the same shape as node A connected to each of node B and node C. Tree structures (across different time intervals) that share the same shape are clustered together into a single cluster. Further, the interface can facilitate the identification of the clusters, and the presentation of an option for the user to name each of the different presented clusters. The interface can also present options for manually transitioning between time intervals or automatically playing a video between time intervals. Advantageously, shape clustering enables a user to identify other intervals that experienced similar events, such as a failure.

In another embodiment, the user interface can include a query builder that enables a user to generate queries to identify shapes that satisfy a user-defined range. For example, the query builder can enable a user to select a shape of a process flow (e.g., a particular tree structure). In response to selecting the shape, the user interface can display a visualization of the tree structures (e.g., a flow diagram including a plurality of stages and connections between the stages). The connections presented on the user interface may be indicative of the count of log messages that flow from one stage to another stage. Further, the user interface can enable the user to define a range of the count of log messages by expanding the boundary of a connection to be wider and/or reducing the boundary of a connection to be thinner. In some cases, the user interface can present two different shapes, where the shape is adjusted by the user and a similarity factor can be defined by the user for the query. For example, the selected shape of a process flow can be modified by the user to have wider or thinner connections, and the user can input a percentage value of a threshold similarity between shapes. The query can then be executed to find all shapes with a strength that is within the percentage of the threshold similarity. When the user modifies the shape on the user interface, the back-end queries are simultaneously updated to correspond to the modifications made by the user. For example, if a user redefines a boundary of a connection to a range of 1 to 10, the back-end queries can automatically to updated so as to reflect the user-defined range.

In another embodiment, many customers have log sources without transaction identifiers. For this embodiment, a user can select one or more base characteristics of log messages in a log source by constructing a query. In this scenario, there is no separate flow key to connect messages over different times, but all messages occurring in same time-based intervals may be analyzed together without showing a flow over time. Instead, the flow is shown based on variances in characteristics other than the base characteristics. Different buckets of values of the base characteristics connect visually and spatially on a GUI to different buckets of other values of other characteristics. The GUI also provides options for adding even more other characteristics to branch off of the base characteristics and other characteristics to see a distribution of data values for the time-based interval. The interface also provides options for manually transitioning between time intervals or automatically playing a video between time intervals. For example, the user can construct a query that filters for all log messages from a particular log source during a particular interval and the "machine name" of the log messages. By constructing the query, the user can see changes in the characteristic over time. Further, the user can add filters to the query to see sub-characteristics (e.g., severity, module) of the selected characteristic. Query results are visualized in an adaptive flow diagram that shows bands representing counts that connect to each characteristic. Further, once a process flow has been presented on the interface, the flow model can be saved (e.g., the underlying query/structure of the flow can be saved) and rebuild at a later date automatically with a single click (for any other time period or time interval).

The embodiments described above may be implemented with one or more aspects of the disclosure of U.S. Provisional Patent Application No. 62/396,000, filed Sep. 16, 2016, the disclosure of which is incorporated by reference herein in its entirety for all purposes.

BRIEF DESCRIPTION OF THE DRAWINGS

The specification makes reference to the following appended figures, in which use of like reference numerals in different figures is intended to illustrate like or analogous components.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
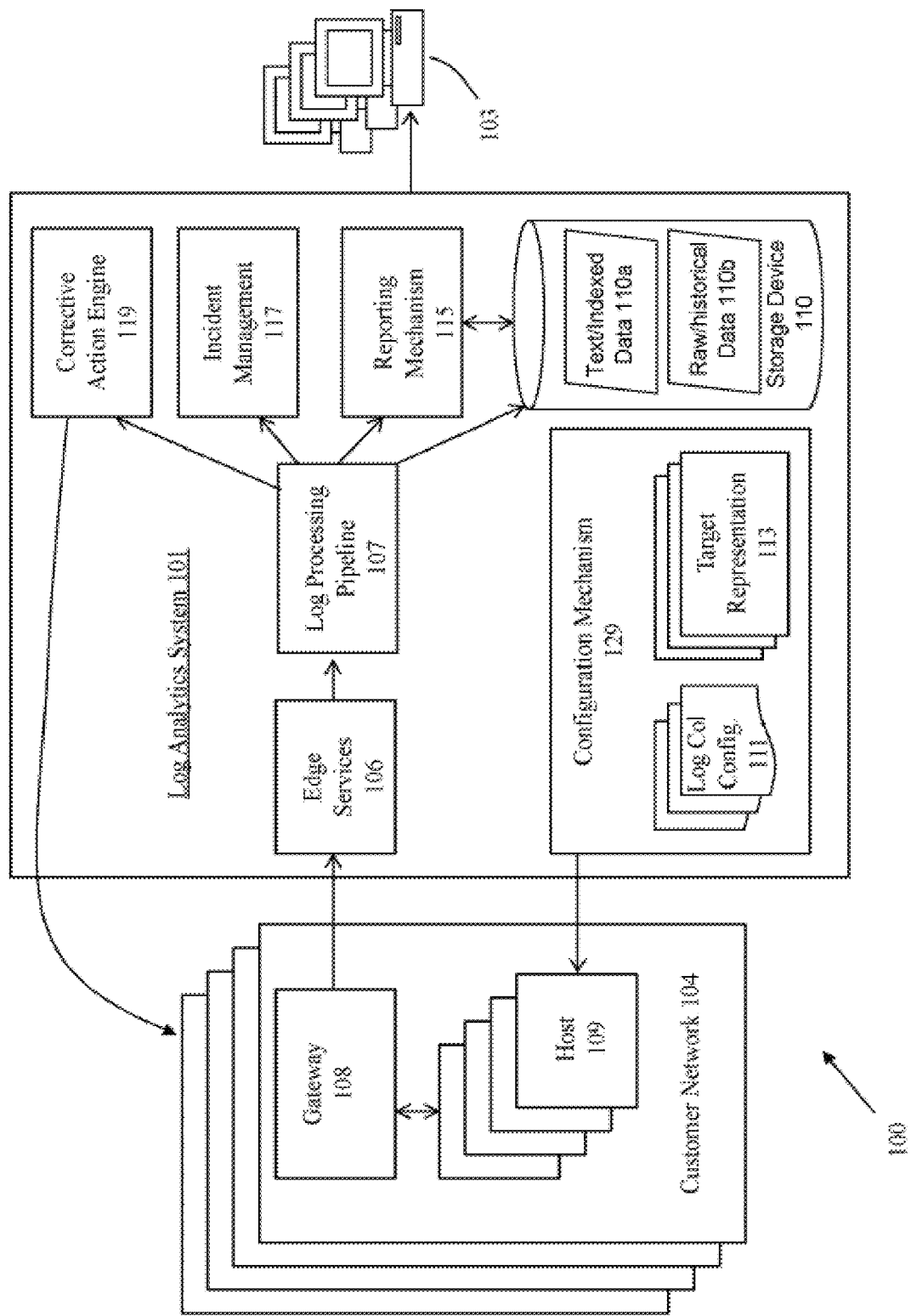
FIG. 1A illustrates an example system for configuring, collecting, and analyzing log data according to some embodiments of the invention.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 103, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
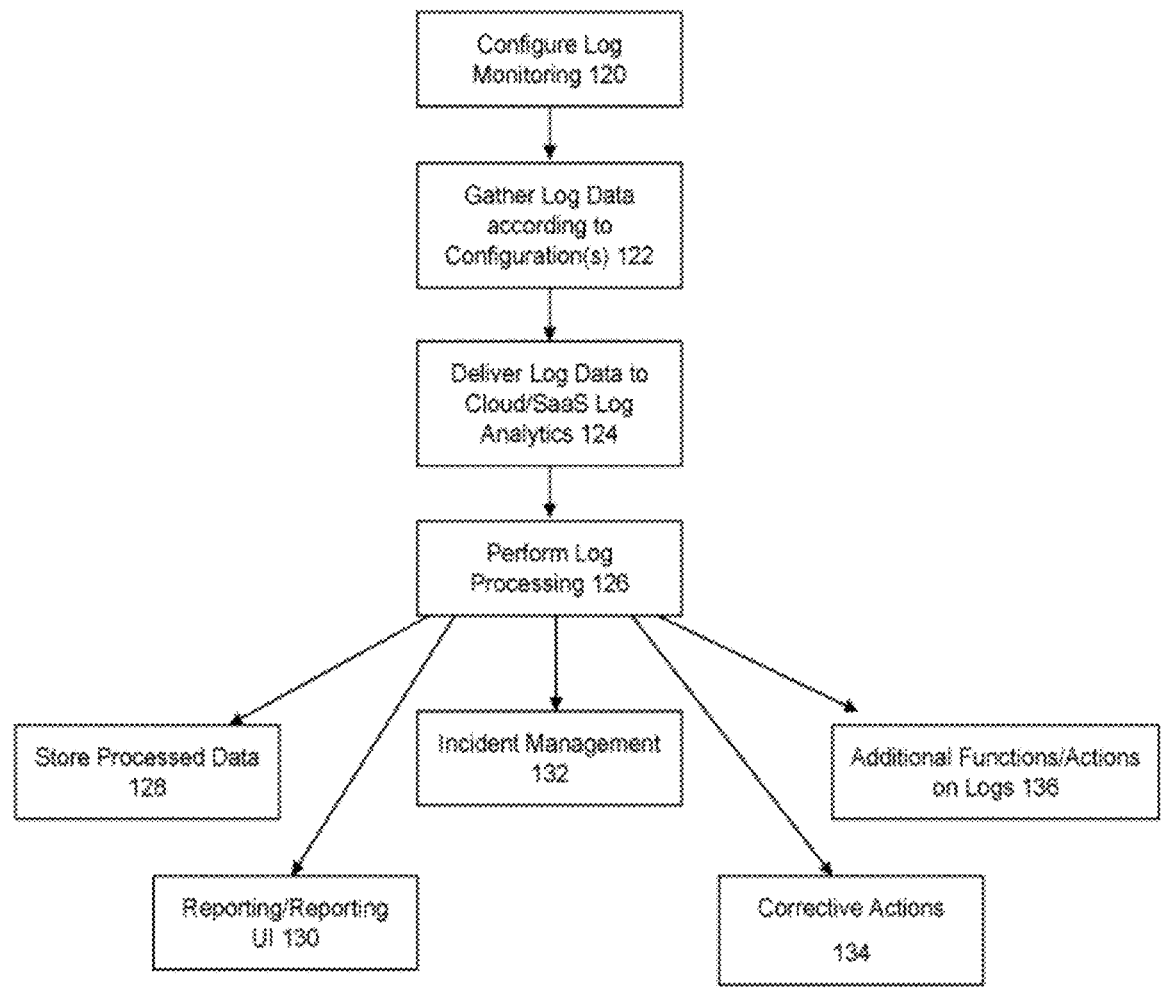
FIG. 1B shows a flowchart of an approach to use an example system to configure, collect, and analyze log data.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source enterprise search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
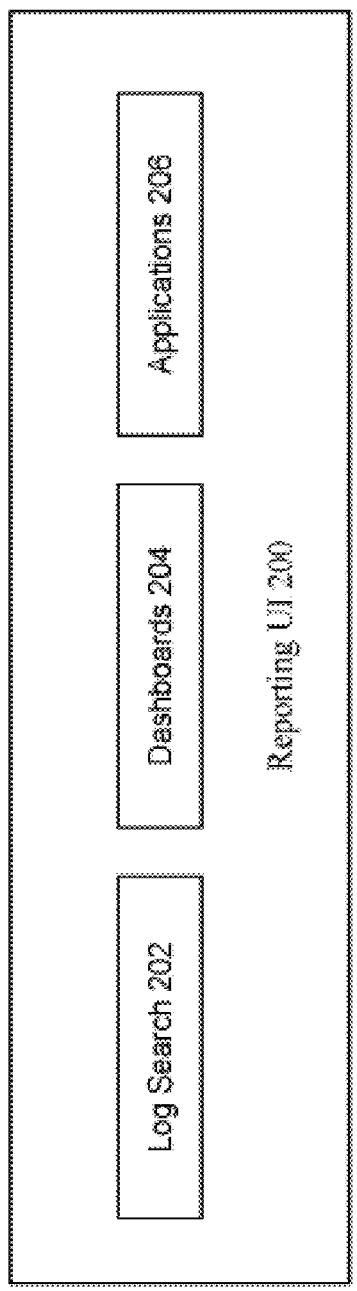
FIG. 2 illustrates an example reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
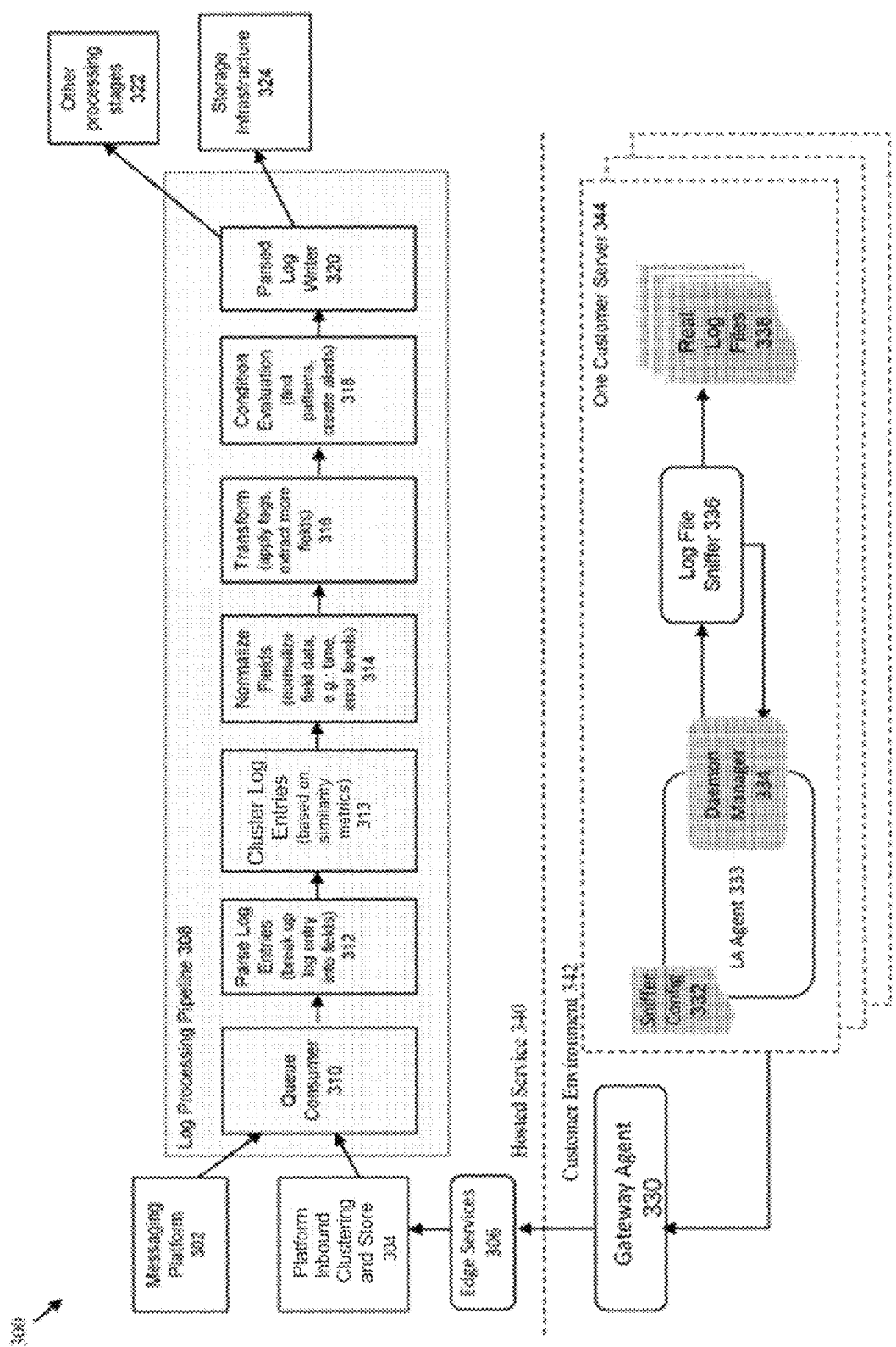
FIG. 3A illustrates a more detailed illustration of the internal structure of the log analytics system.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case unabbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
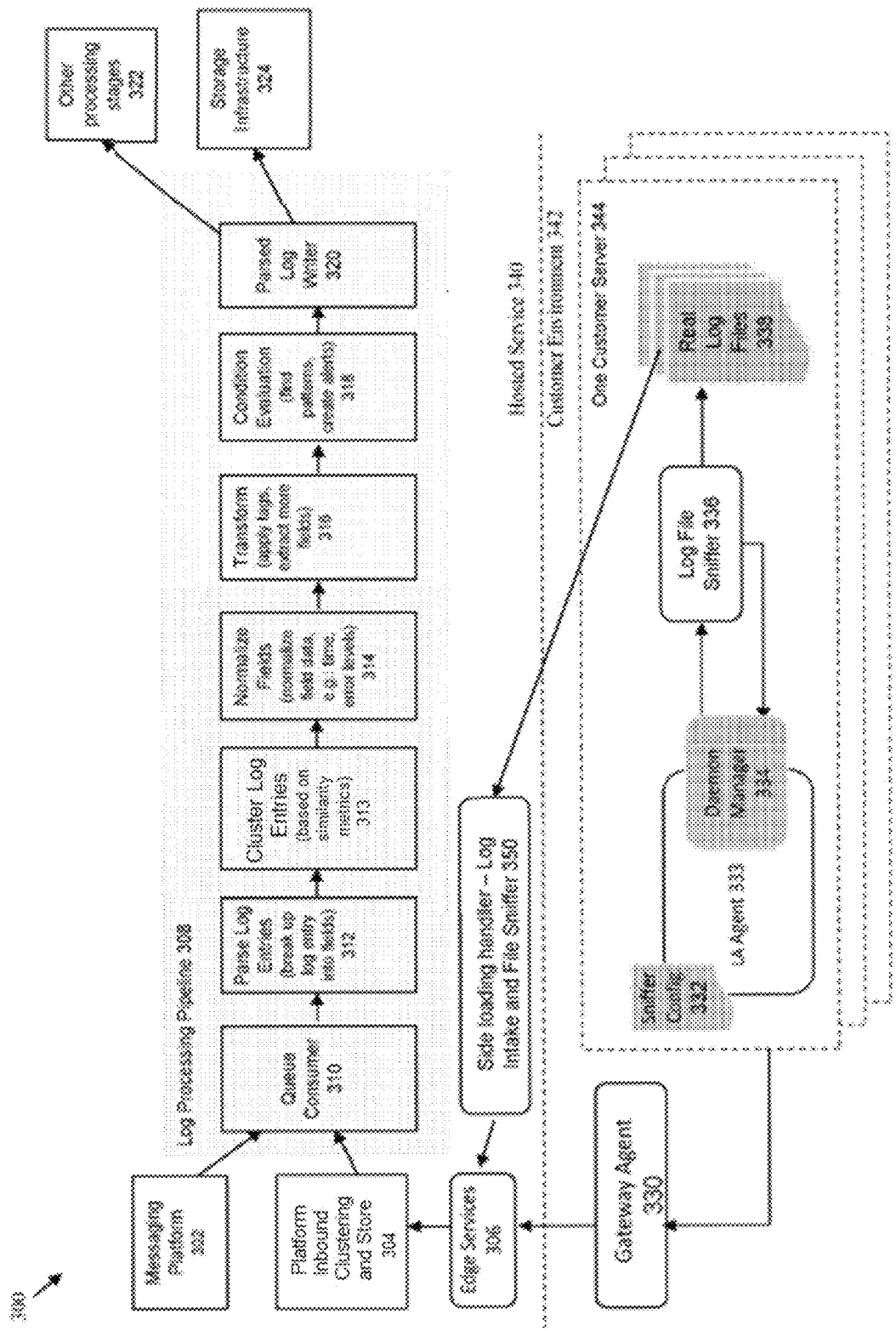
FIG. 3B illustrates a side loading mechanism to collect log data without needing to proceed through an agent on the client side.
Figure 3C:
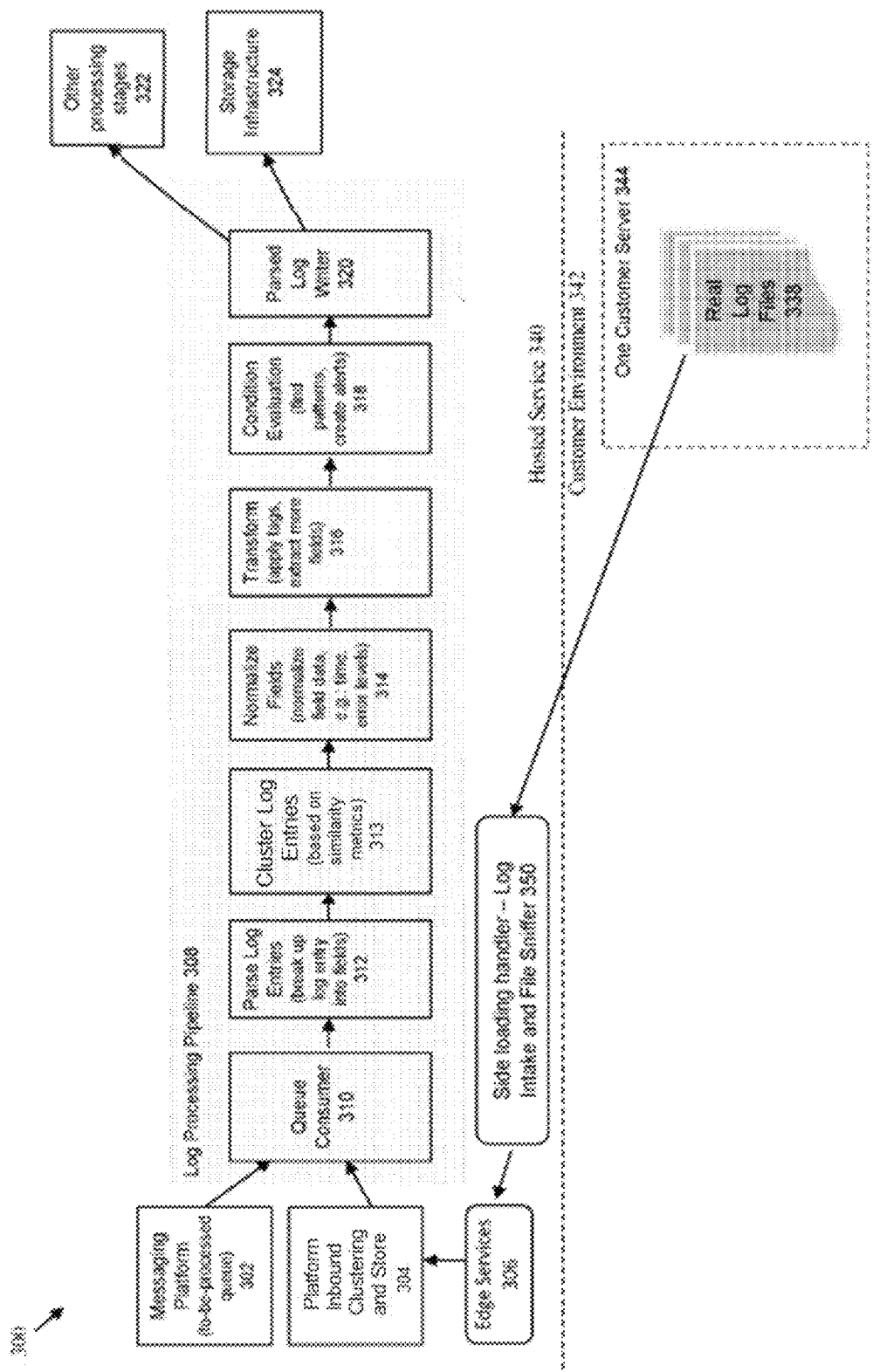
FIG. 3C illustrates another embodiment of FIG. 3B.

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

According to aspects of the present disclosure, many business applications have transactional flows (e.g., a flow of one or more stages of a transaction). The flow may be identified using a flow key (e.g., a transaction ID) or any other field present in a log file. The flow key can be used to connect different records and to identify the steps involved in a particular transaction. This feature facilitates the determination of which transaction IDs correspond to a failed operation in the flow in a particular time interval.

Figure 4:
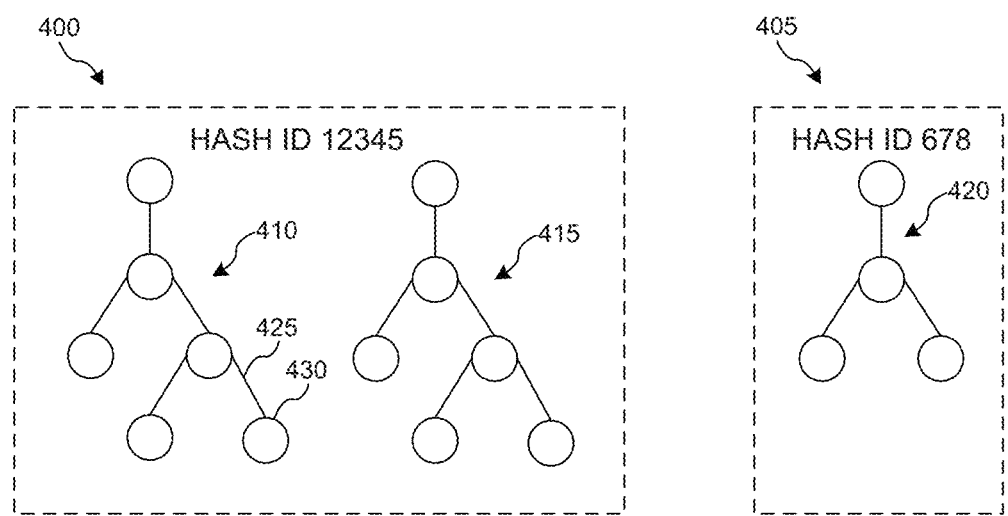
FIG. 4 is an example representation of clustering process flows based on the shape of the process flow.

FIG. 4 shows an example of clustering process flows based on the shape (e.g., structure of the tree) of the process flow. As an example, FIG. 4 illustrates process flows 410, 415 and 420. Each of process flows 410, 415, and 420 can include one or more nodes and one or more connections between nodes. For example, a node can represent a stage of the process flow (as described above) and a connection between two nodes can represent a strength of the data flow between two stages (e.g., the strength representing a number of log messages that flowed from one stage to another). Further, each of process flows 410, 415, and 420 can be stored in separate a data structures.

In some implementations, process flows that have the same shape can be clustered together. For example, as illustrated in FIG. 4, process flows 410 and 415 have the same shape, and process flow 420 has a shape that is a different from the shape of process flows 410 and 415. In this example, process flows 410 and 415 can be clustered together into group 400 and process flow 420 can be included in a separate group 405. Further, particular shapes of process flows can be labelled so as to represent the clustered process flows. Clustering can be performed by clustering logic.

Further, a process flow can be represented by a shape and a particular shape can be labeled by a user. The various process flows can be searchable by shape and additional statistics on an identified shape can be viewed. In cases where a first process flow has the same shape as a second process flow, each of the first and second process flows can be clustered together and assigned the same shape identifier (ID). In some implementations, a hash value can be generated for each process flow using a hashing algorithm. The hashing algorithm can be configured to generate the same has value for the same or similar shapes of process flows. A data structure is stored in memory for each process flow, and the data structure represents the process flow. In the example illustrated in FIG. 6, the hash value for each of process flow 410 and 415 is "12345" and the hash value for process flow 420 is "678." The hash value may be the output of the hashing algorithm, which takes as an input the data stored in the data structure corresponding to the process flow. In this manner, if two different process flows have the same shape, they may have the same information stored in their corresponding data structures, and thus, the hashing algorithm may output the same hash value when applied to the process flows.

In some implementations, a connection between nodes (e.g., connection 425 connected to node 430) may represent the strength of the connection. Further, the strength of the connection can represent the number of log messages that flowed from one stage to another in the process flow. In some cases, the shape of two process flows may be the same (e.g., stage A connects to stage B, which splits and connects to each of stage C and D), but the connections between the stages may have different strengths. In these cases, the clustering of process flows can additionally be based on the strength of the connection. For example, in these cases, the hashing algorithm can be configured to receive as inputs the shape of the process flow and the strength of the connections between stages. As a non-limiting example, if a process flow includes stage A, which connects to stage B with a strength of "5," and if stage B connects to stage C with a strength of "10," then the hashing algorithm will take in as an input the shape of the process flow (e.g., A connecting to B and B connecting to C) and the strength of each connection (e.g., the first connection having a strength of "5" and the second connection having a strength of "10"). The hash value that is generated as an output of the hashing algorithm can be based on both the shape and the strength of the connections.

In some implementations, the strength of the connections of a process flow can be bucketized. For example, if two process flows have the same shape, the two process flows may be clustered together of the strength of the connections for each process flow is within a predefined range (e.g., 1 to 10). Similarly, if two process flows have the same shape, but one process flow has strengths inside the defined range, and the other process flow has strengths outside of the defined range, then the two process flows will not be clustered together (e.g., each of the two process flows will be assigned different hash values in this scenario). It will be appreciated that clustering of process flows can be based on various factors, including, but not limited to, the shape of the cluster, the strength of the connections between stages, elapsed processing time experienced at a particular stage, whether or not there was a failure stage or not, and other suitable factors. Further, it will be appreciated that different clusters can be weighted and combined into a new cluster.

In some implementations, a user may query a data store for any or all process flows which included a failure stage (e.g., or alternatively, where there was no failure stage) without considering the shape of the process flow. In some cases, for process flows where there were no failure stages, the user may query for process flows that experienced high load and process flows that experienced low load. The process flows that are identified as a result of the query may have same shape, however, the process flows may have different strengths of the connections within the shapes. For example, a first process flow (e.g., representing an early morning time interval) may have the same shape as a second process flow (e.g., representing a peak time interval). However, the first process flow may have experienced a low load, whereas, the second process flow may have experienced a high load.

In some implementations, the hashing algorithm is configurable so as to receive one or more data points as an input. Examples of inputs that the hashing algorithm can be configured to receive may include the shape of a process flow, the connection strength between two stages (e.g., the count of the data flow), the percentage of the connection strength as compared to all log messages in the process flow, and other suitable inputs.

It will be appreciated that process flows can be clustered based on the shape of the process flows, regardless of whether the process flow involves a transactional flow key or not. In cases where the process flow includes a transactional flow key, the shape of the process flow (e.g., the shape of the tree) is based on the flow of log messages between stages. However, in cases where the process flow does not include a transactional flow key, the shape of the process flow is user defined because the shape is based on which characteristics the user is interested in drilling down.

It will be appreciated that process flows can be fed into a learning algorithm to predict whether or not the process flow will experience a failure stage. For example, the system can pull in new log messages that have not been labeled before. The new log messages can be fed into a computational model generated based on machine-learning techniques so as to predict whether the new log messages will experience a failure somewhere along the process flow. In this example, as new log messages (which have not been labeled) are received, the learning model can predict which existing shape (e.g., tree) will match the new log messages. As a non-limiting example, the learning model may predict failures before they occur in cases where the new log messages form a process flow with a shape that is similar to other shapes that include a failure stage.

It will also be appreciated that a user interface may be provided that enables a user to generate an editable query. For example, if a user selects a process flow with a particular shape, a natural language query can be generated (but not yet transmitted) that defines the shape (e.g., stage A to stage B with a strength of 10). The user interface can enable the user to modify or edit the query before the query is transmitted to a data store and executed. For example, the user interface can enable the user to change the query so that the strength is a range between 1 and 10, instead of a static value of 10. The range can be used to identify all other shapes with stage A connected to stage B with a strength of any number between 1 and 10. In these examples, when a user selects a shape and modifies the shape for the purpose of querying shapes that are similar to the modified shape, the back-end queries that are generated are exposed to the user in a natural language format (e.g., a human-readable format). An example query may include a request for shapes where the data flowed from an agent device to a data receiver with the condition that all high volume is treated as one shape and low volume is treated as another shape. In some implementations, the user interface can provide a query builder that enables the user to identify the name of the shape (e.g., shape ID) as a starting point. Further, the user interface can enable the user to stretch pieces of the shape out or in (e.g., the user can expand a connection to be larger or reduce the size of a connection to be smaller) to define a range of values for which the query should cover. In some cases, the user interface can present two different shapes, where the shape is adjusted by the user and a similarity factor can be defined by the user for the query. For example, the selected shape of a process flow can be modified by the user to be bigger or smaller (e.g., with respect to the size of the connections representing the number of log messages flowing between two stages), and the input corresponding to a percentage of a threshold similarity between shapes can be received at the user interface from the user device. The query can then be executed to find all shapes with a strength that is within the percentage of the threshold similarity. When the user modifies the shape on the user interface, the back-end queries are simultaneously updated to correspond to the modifications made by the user.

Advantageously, a user interface can enable a user to identify a shape of a process flow, and in response a visualization of the shape can be presented on the user interface. Further, the user interface can receive input corresponding to an adjustment of the boundary lines of the connections (e.g., representing the count of log messages flowing between two stages) by dragging the boundary lines out or in and then clicking "Search." A search can be then be performed for all shapes that are within the boundary lines defined by the user.

Figure 5:
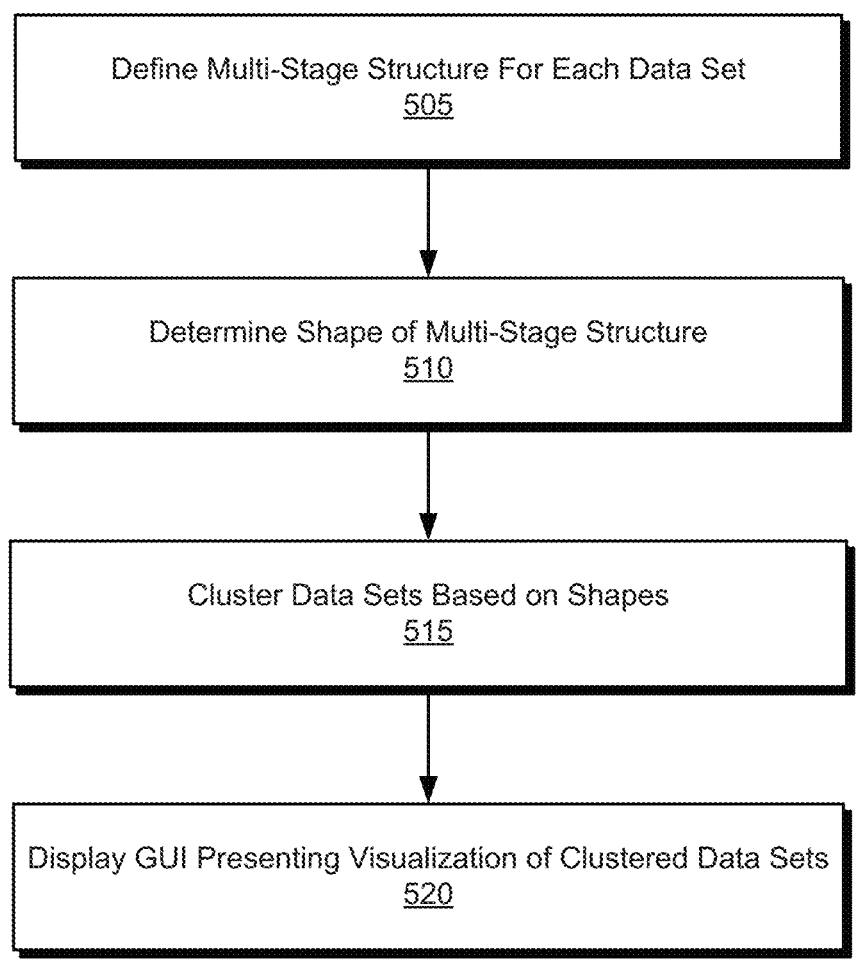
FIG. 5 is a flowchart illustrating an example process for clustering process flows based on the shape of the process flows.

FIG. 5 is a flowchart illustrating an example process for clustering process flows based on the shape (e.g., tree structure) of the process flows. Process 500 can be performed at least in part by a log analytics system (e.g., log analytics system 101). Further, process 500 can be performed to cluster process flows based on the tree structure associated with the process flows. Process 500 begins at block 505, where a first multi-stage structure is identified. In some cases, the first multi-stage structure can be identified for each data set of a plurality of data sets. Each data set of the plurality of data sets is represents the set of log messages recorded during a defined time period. Further, each log message of the set of log messages includes a timestamp that is within the time period of the corresponding data set.

Figure 6:
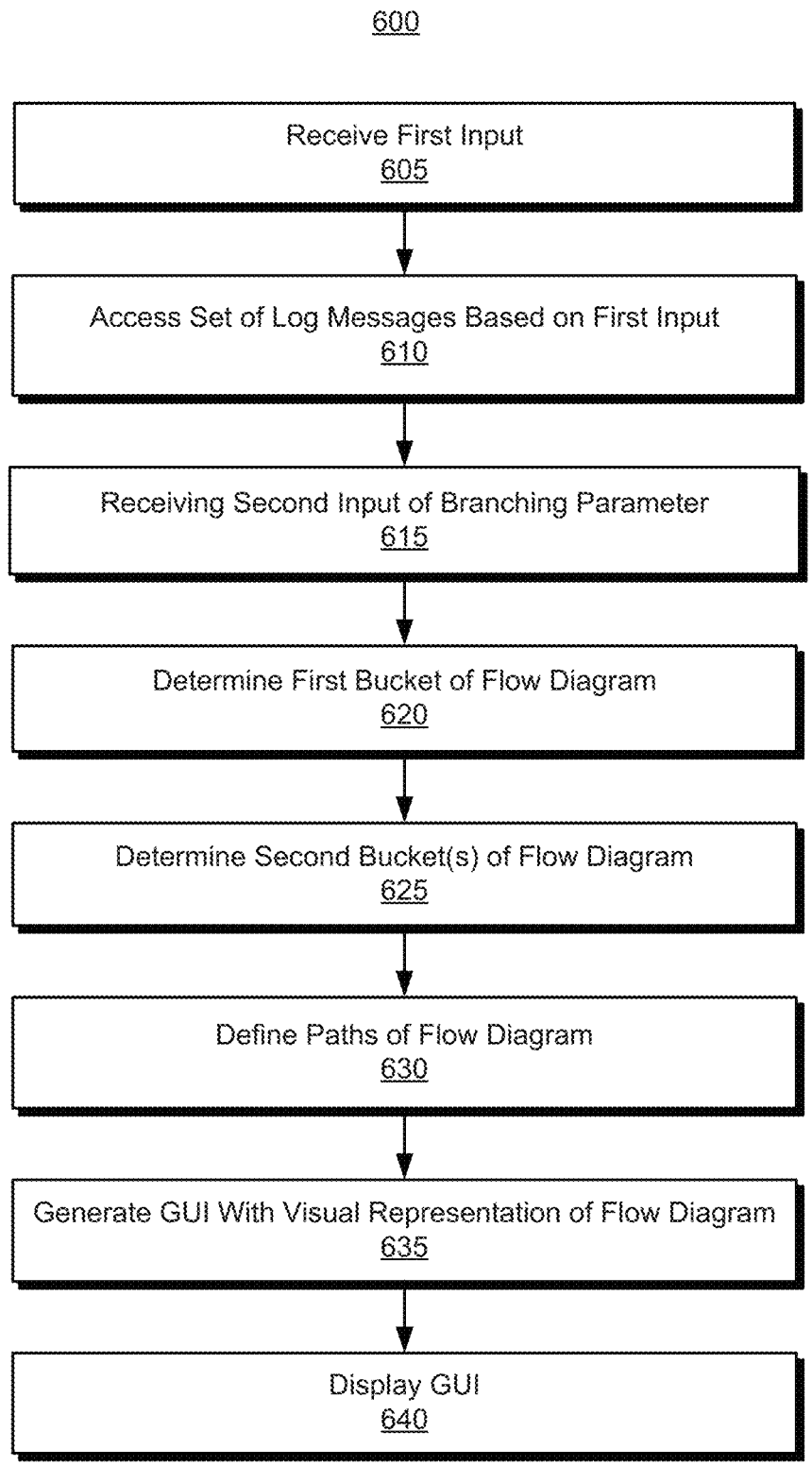
FIG. 6 is a flowchart showing an example process for displaying branching trees in the log analytics context.

In some implementations, the first multi-stage structure is generated based on a set of log messages corresponding to the data set. For example, the first multi-stage structure can be generated based on all of the log messages that were recorded during a particular time interval. The first multi-stage structure may represent the flow of a transaction (and all the log messages that were recorded at different machines) during the particular time interval. In addition, the first multi-stage structure can be a tree structure (e.g., a process flow with one or more branches, a workflow with one or more paths, etc.) that includes a set of nodes and a set of node connections. For example, the first multi-stage structure can include a first node, which represents a first stage of the process flow during the time interval, and a second node, which represents a second stage of the process flow during the time interval. The second stage may represent log messages recorded with timestamps that are later than the log messages represented by the first stage. As a non-limiting example, the first stage may represent the login step of a transactional flow and the second stage may represent a checkout step of the transactional flow. Further, a stage of the plurality of stages can represent a relative time sequence associated with log messages that are assigned to the stage relative to a time of corresponding log messages that are assigned to one or more adjacent stages. In some implementations, the connections between two nodes may represent a count of log messages that are linked between the two nodes. For example, each connection of the set of node connections connects a first node associated with a first subset of the set of log messages with a second node associated with a second subset of the set of log messages. In some instances, the user interface presents the connections as a flow line with a defined width. For example, the width of the flow line may be indicative of the count of log messages that flow between the two nodes. An example user interface is illustrated in FIG. 6.

At block 510, a first shape of the first multi-stage structure may be determined. Determining the shape of a multi-stage structure can be performed by storing data representing the shape of the multi-stage structure in a data structure. The data representing the shape may include, for example, an indication of the nodes and the corresponding connections, such as node A is connected to node B with a strength of 5, node B is connected to node C with a strength of 1, and node B is also connected to node D with a strength of 10. The data structure may or may not store the strengths of the connections (e.g., the count of the log messages flowing between two nodes), depending on embodiments. The shapes of the various multi-stage structures that are identified for each data set of the plurality of data sets can be clustered so as to group data sets that correspond to similar shapes (e.g., similar process flows).

At block 515, the data sets of the plurality of data sets can be clustered. In some implementations, the clustering of data sets can be based at least in part on the shapes of the various multi-stage structures. For example, multi-stage structures that correspond to the same shape (e.g., the multi-stage structures that include tree structures defined by node A connected to node B, and node B connected to each of node C and node D are clustered together). Clustering the data sets can be implemented by executing the hashing algorithm on the data structures that correspond to the multi-stage structures, and grouping the resulting hash values that are the same into one cluster. In some cases, executing the hashing algorithm on two different multi-stage structures that each share the same shape can result in the same hash value. In these cases, the data structures of the two different multi-stage structures may be the same or similar to each other because the two different multi-stage structures share the same tree structure (e.g., shape).

It will be appreciated that clustering may be performed on the data sets of the plurality of data sets based on factors other than, in addition to, or in lieu of clustering based on the shape of the multi-stage structures. For example, the data sets may be clustered based on the processing time (e.g., the time elapsed for the process to complete).

Figure 7:
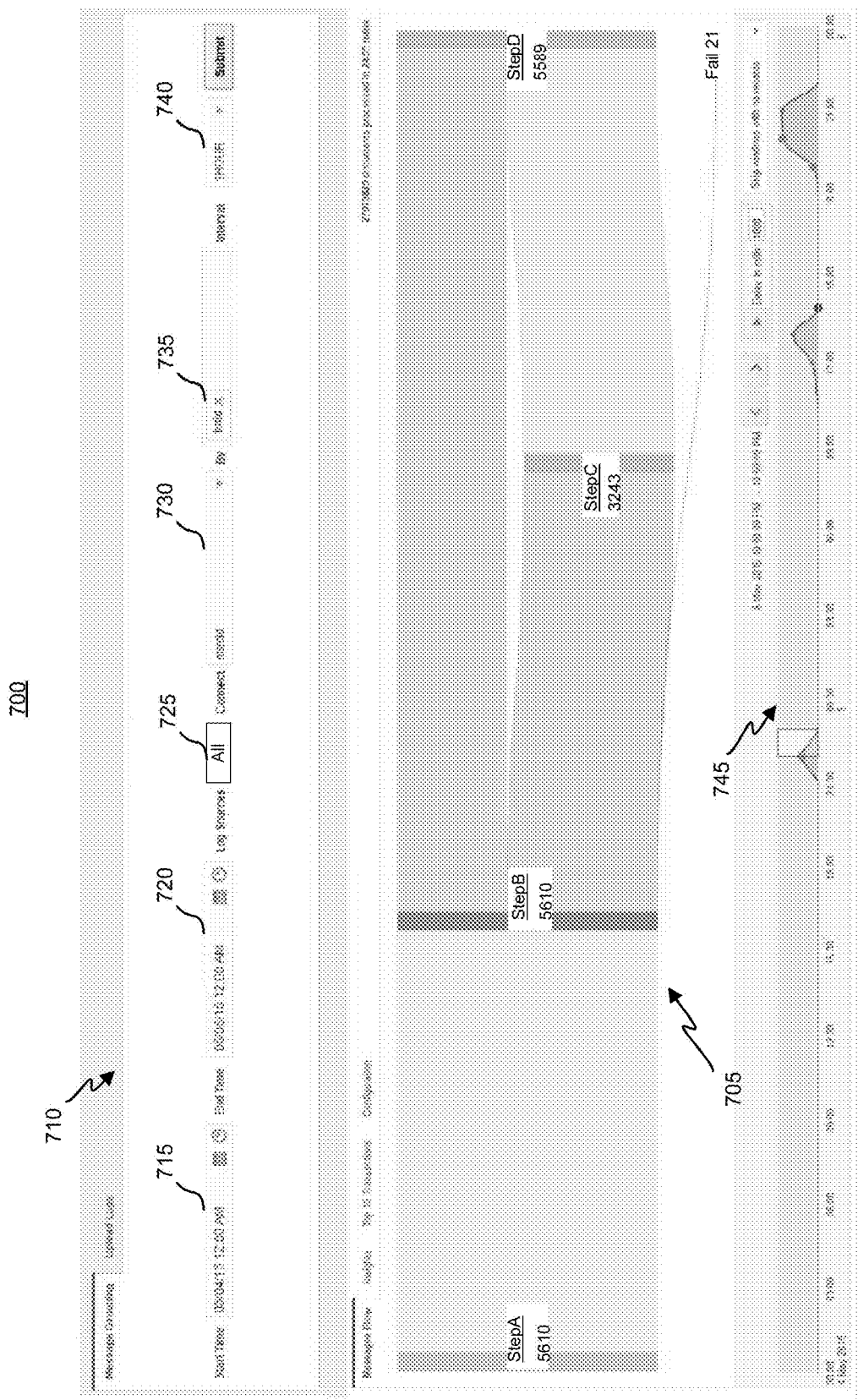
FIG. 7 is an example user interface according to certain embodiments of the present disclosure.

At block 520, a graphical user interface (GUI) can be presented on a user device. In some implementations, the GUI can include a visualization of the clustered shapes (e.g., as shown in FIG. 7). As only a non-limiting example, the visualization of the clustered shapes can include a pie graph, in which each segment corresponds to a different shape and the size of the segment corresponds to the percentage of that shape (e.g., the number of a particular shape divided by all shapes). Cluster membership may correspond to an identification of the segment to which a shape belongs. It will be appreciated that the GUI can provide input elements that enable a user to define a name of each shape ID. A shape ID corresponds to the identifier of a shape. For example, all shapes that include node A to node B, and node B to each of node C and node D can correspond to the same shape ID. That is, a shape ID may not identify a specific shape during a specific time interval, but rather, the shape ID may identify a cluster membership (e.g., a segment in the pie chart of FIG. 7). It will be appreciated that the visualization presented on the GUI can include one or more fields configured to accept input form the user. The input can identify a name for each of one or more data clusters (e.g., a name for each segment in the pie chart, a name for each member of the cluster membership). It will also be appreciated that each data set of the plurality of data sets may be associated with a different time period on a time scale (e.g., each time segment may correspond to a 24 hour period within a week). Further, a given data set corresponds to a set of log message, which each include a timestamp that is within the time period defined by the data set. It will also be appreciated that the a shape is not clustered with another shape when the two shapes are not the same or are not similar (e.g., not within a defined similarity threshold).

It will also be appreciated that the hashing algorithm that is executed on each of the multi-stage structure (e.g., each process flow) generates a hash value. The hashing algorithm can be configured so that any multi-stage structures with the same shape or a similar shape (e.g., within a defined similarity threshold) will result in the same hash value. Clustering can include grouping shapes that correspond to the same hash value into a single cluster. It will also be appreciated that the hashing algorithm can receive (as an input in addition to or in lieu of the shape) a strength of each connection of the set of connections. The strength is indicative of a count of log messages that link between two nodes. For example, the number of log messages that flow from stage A to stage B indicates the strength of the connection. For example, flowing from stage A to stage B can include identifying that a particular transaction key is included in a log message associated with stage A, and that the same particular transaction key is included in a log message associated with stage B, which represents the flow of stage A to stage B in a transactional flow. In some implementations, the clustering of the data sets of the plurality of data sets may be further based at least in part on the strength of each connection of the set of connections. For example, the strength of connections can be bucketized so that each bucket (e.g., strength of 1000-2000, 2001-3000, 3001-4000, and so on) can be considered a different shape, even if the tree structures are the same (e.g., node A connects to each of node B and node C). In some implementations, process 500 can further include accessing a learning model configured to predict failure messages, receiving one or more new log messages that have not been labeled, feeding the one or more new log messages into the learning model, identifying a new shape associated with the one or more new log messages, and comparing the new shape with one or more existing shapes to identify whether the new shape corresponds to an existing shape that includes a failure stage.

In some implementations, the GUI can include a query builder that enables the user to identify the name of a shape (e.g., shape ID, hash ID, hash value, etc.) as a starting point. Further, the GUI can present the identified shape and enable the user to stretch or minimize the connections of the shape (e.g., the user can expand a connection to be larger or reduce the size of a connection to be smaller) to define a range of values for which the query should cover. In some cases, the GUI can present two different shapes, where the shape is adjusted by the user and a similarity factor can be defined by the user for the query. For example, the selected shape of a process flow can be modified by the user to be bigger or smaller (e.g., with respect to the size of the connections representing the number of log messages flowing between two stages), and the input corresponding to a percentage of a threshold similarity between shapes can be received at the user interface from the user device. The query can then be executed to find all shapes with a strength that is within the percentage of the threshold similarity. As another example, the query can be executed to final all shapes that have strengths that are within the user-defined range of the connections. When the user modifies the shape on the GUI, the back-end queries are simultaneously updated to correspond to the modifications made by the user. In these implementations, the GUI can present a natural language (e.g., English language, human-readable language, etc.) query that corresponds to the identified or selected shape. As a non-limiting example, a query that may be presented on the GUI for a selected shape of stage A to stage B to stage C may include "Stage A connected to stage B, which is connected to stage C."

Advantageously, a GUI can enable a user to identify a shape of a process flow, and in response, a visualization of the shape can be presented on the GUI. Further, the GUI can receive input corresponding to an adjustment of the boundary lines of the connections (e.g., representing the count of log messages flowing between two stages) by dragging the boundary lines out or in and then clicking "Search." A search can be then be performed for all shapes that are within the boundary lines defined by the user.

FIG. 6 shows an example process for displaying branching trees in the log analytics context. Process 600 can be performed at least in part by a log analytics system (e.g., log analytics system 101). Further, process 600 can be performed to generate and display a flow diagram of a transactional flow process. The flow diagram can illustrate the various stages and trajectories of the transactional flow process. Process 600 begins at block 605 where first input corresponding to a selection of a set of log messages is received at a user interface. In some implementations, the set of log messages may include log message from a plurality of log sources. In these implementations, the log messages may be linked across different log sources using a unique flow key. For example, a flow key can be used to link a log message recorded at a first log source and another log message recorded at a second log source. In some implementations, the set of log messages may be recorded by a single log source. In these implementations, a flow key may not be included or available in log messages.

At block 610, the set of log messages are accessed based on the received first input. The set of log messages can include a plurality of subsets of the set of log messages. Each subset of the set of log messages can correspond to a defined characteristic. In some implementations, a defined characteristic may include the particular log source of the log message. In some implementations, the defined characteristic may include a data point included in the log messages. For example, the defined characteristic may be a machine (e.g., server) on which the log message was processed. Other examples of the defined characteristic may include the severity of the machine or the module used at the machine.

At block 615, the user interface can be configured to receive second input corresponding to a selection of a branching parameter configured to facilitate branching of one or more paths in a flow diagram. In some implementations (e.g., where log messages include a flow key), the branching parameter may be the flow key that is to be used to link log messages recorded across different log sources. In some implementations (e.g., where no flow key is used), the branching parameter may be a base variable that is used to define the branches of the flow diagram. For example, in these implementations, the branching parameter may be a character that the user selects to drill down. Upon selecting a parameter, the different values of the parameter may be used to define branches. As a non-limiting example, if the parameter is the "machine" that processed the log message in a log source, the parameter may be a base variable that represents the several different machines that process log messages. Thus, the flow diagram can include a branch to each of the different machines, representing the different values of the parameter.

At block 620, a first bucket of the flow diagram can be determined. For example, the first bucket can represent the all of the set of log messages in the log source. At block 625, one or more second buckets can be determined. In some implementations, the set of log messages can be filtered by the parameter, and each filtering result (e.g., filtering the set of log messages by a particular value of the parameter) can correspond to a second bucket. For example, the one or more second buckets can represent the distribution of values of the parameter (e.g., the different values for the parameter of "machine name"). Further, each log message included in a second bucket corresponds to the particular value of the parameter (e.g., the defined characteristic) for that second bucket. For example, each log message in the second bucket that represents a particular value of the parameter can include the particular value. As such, the one or more second buckets are filtering results of filtering the first bucket by the different values of the parameter. At block 630, a path can be defined from the first bucket to each of the one or more second buckets.

Figure 9:
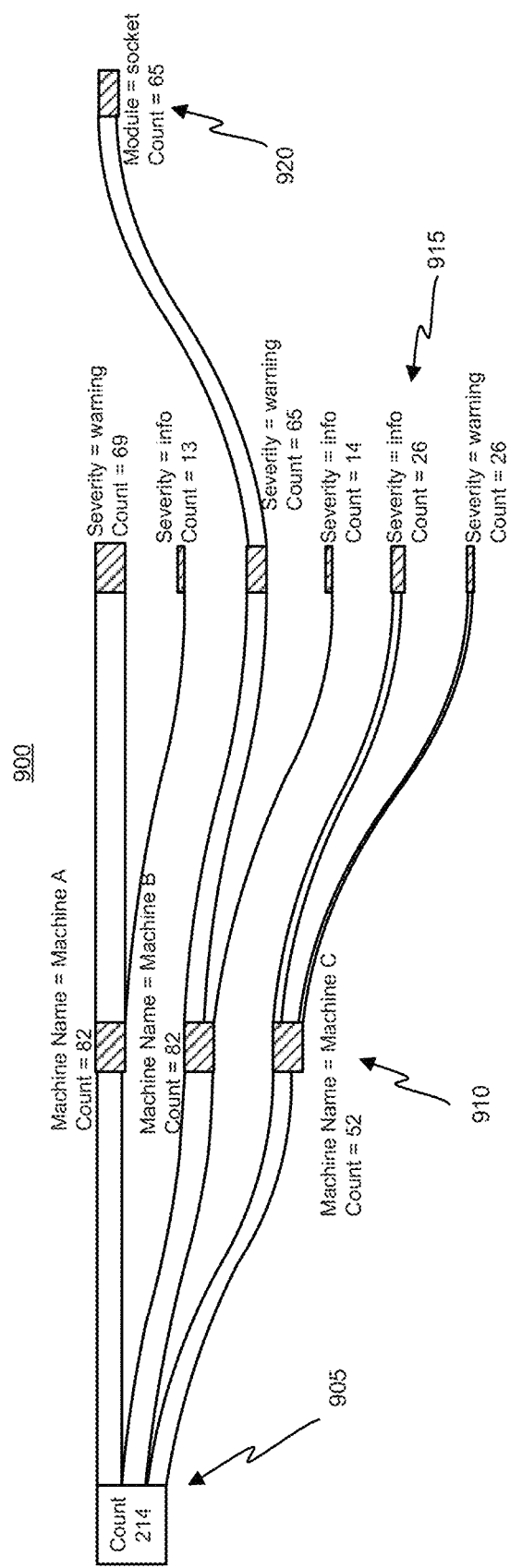
FIG. 9 is an example user interface according to certain embodiments of the present disclosure.

At block 635, a GUI can be generated that includes a visualization of the one or more paths of the flow diagram. A non-limiting example of the GUI is illustrated in FIGS. 7 and 9. For example, a path of the one or more paths can visually connect the first bucket with a second bucket. It will be appreciated that the flow diagram can include several levels (e.g., the first level corresponding to the first bucket, the second level corresponding to the second bucket, the third level corresponding to a third bucket, and so on), as shown in FIGS. 7 and 9. FIG. 7 illustrates an example of GUI presenting the flow diagram if the transactional flow uses a flow key, and FIG. 9 illustrates an example of the GUI presenting the flow diagram where there is no flow key (e.g., the distribution of values of the parameter is represented, as opposed to the stages of the flow, as in FIG. 7). At block 640, the GUI including the visualization can be displayed.

FIG. 7 shows an example presentation of an interface presented on a user device (e.g., an administrator device associated with an administrator). Interface 700 can facilitate identifying process flows and present a visual representation (e.g., a flow diagram, a Sankey diagram, etc.) of one or more stages of the identified process flows. For example, interface 700 can include a visual representation of process flow 705.

Process flow 705 can include one or more stages of a business flow (e.g., a process flow) that includes one or more stages. In some embodiments, a process flow can be performed by an application (e.g., a web application). For example, a process flow can be a flow of stages that occur when users log into a website and perform one or more actions (e.g., check email, recharge cell phone minutes, purchase an item, etc.). The data generated by the process flow (e.g., data related to interactions between a user device accessing a server as part of the process flow) can be managed by various software modules. A software module can track or log the interactions involved during a particular stage of the flow, and store the log in a log file (e.g., a log source). A log file can include one or more log records (e.g., log messages), such that each record represents an interaction between a user device and a server. Further, each record can include various data relating to the interaction (e.g., a transaction identifier (ID), a user ID, a session ID, a timestamp of when the log record was generated, etc.). For example, if 1000 users logged into a web site, a log file can include a record of each user that logged into that website (e.g., at least 1000 log records) and information related to the logging in for each user (e.g., a time stamp, a user ID, a session ID, whether the logging in was successful, whether the software module managing the logging was executed properly, etc.).

In some embodiments, the systems and methods of the present disclosure can facilitate the grouping or bucketing of transactions into intervals (e.g., a time interval of 1 hour), such that there are snapshots of the entire process flow for each time interval. Advantageously, the bucketing of transactions into intervals can enable administrators to analyze or troubleshoot a process flow by comparing snapshots over time.

Referring again to the example illustrated in FIG. 7, process flow 705 can include stages StepA, StepB, StepC, StepD, and Fail. In this example, StepA can represent a first stage at which a user device initially interacts with a server (e.g., a login page). Here, the interaction can include receiving an input corresponding to login credentials associated with a user, and processing the login credentials to determine whether the login credentials correspond to an authorized user. Further, StepA can correspond to a log file that includes log records of all interactions (e.g., transactions) between user devices and a server during a particular time interval (e.g., May 4, 2015, 10:00:00 PM to 10:59:59 PM). Further, interface 700 can present a snapshot of the entire process flow 705 during the particular time interval. Next, process flow 705 can include StepB, which can represent a next stage of the transaction flow of process flow 705. For example, StepB can represent the next stage of the flow after a user logs into a website (e.g., selecting a folder in an email inbox, selecting to recharge cellphone minutes, selecting an item to purchase on an online platform, etc.). Process flow 705 can also include StepC (e.g., a checkout stage of the process flow) and then StepD (e.g., a payment stage of the process flow). Process flow 705 can also include a "Fail" stage that represents a failure or error that occurred during the flow. The visual representation of the "Fail" stage can be selected to identify which log records indicate that a failure or error occurred.

As a non-limiting example, a user (e.g., a customer using a computing device) can log into a website to recharge cell phone. In this example, the process flow can include presenting an initial page (e.g., a login page) at the computing device, then a page having input fields configured to receive input corresponding to various information from the user, then a validation page, then a payment gateway, and lastly a final screen. The process flow in this example would include the initial page, the page for entering information, the validation page, the payment page, and the final screen. Each one of these steps is monitored or formed using a transaction ID. For example, when the computing device accesses the initial page, a transaction ID is generated, which is then included in a log record. Then, when the next page is presented, a different log record is generated, however, that log record can include the transaction ID which was generated at the login page. Accordingly, a flow of transactions can be monitored, logged, or tracked using a transaction ID. In some embodiments, a transaction ID can be a field which includes a unique value that uniquely differentiates that particular transaction from other transactions.

In some embodiments, the transaction ID can include on or more fields that form a unique key, which can be used to connect and form transactions. Further, in some embodiments, a transaction ID (or any custom field name given by user) can be used by associating more than one field as shown in the example below (as opposed to multiple fields being combined to form a unique key).

Log record in Logsrc1 has field1;
Log record in Logsrc2 has field1, field2;
Log record in Logsrc3 has field2;
Log record in Logsrc4 has field2, field3;
Log record in Logsrc5 has field3.

In this example, the record in Logsrc2 includes field1 and field2 and indicates that these fields are related. Further, Logsrc4 includes field2 and field3 and indicates that these fields are related. In some embodiments, field1, field2 and field3 can be determined as being are related and are part of the same transaction. For example, field3 can be determined as being related to field1 because field3 is related to field2, which is related to field1. Further, in this example, all of the five records above can form one transaction (e.g., Logsrc1 through Logsrc5).

Interface 700 can include menu 710, which can include various input fields for presenting a visual representation of the process flow. In some embodiments, menu 710 can include the following input fields: Start Time 715, End Time 720, Log Source 725, Connect 730, By 735, and Interval 740. Menu 710 and input fields 715 through 735 are exemplary, and thus, the present disclosure is not limited thereto.

For example, interface 700 can receive input corresponding to a start time using the input field Start Time 715 and an end time using the input field End Time 720. In addition, interface 700 can receive input corresponding to a flow key that can be used to connected two or more log files (e.g., stages) in a process flow. For example, interface 700 can receive input corresponding to: 1) "All" log sources using input field Log Source 725, 2) information indicating what is to be connected, such as a log file using input field Connect 730, 3) information indicating which data (e.g., flow key) to use for forming connections between log files or log sources (e.g., a transaction ID) using input field By 735, and 4) information indicating a time interval that can be used to segment the time period between the start time and end time (e.g., 1 hour) using input field Interval 740.

After interface 700 receives an input corresponding to a selection of the "Submit" button, query results can be generated and shown in a flow diagram. For example, query results can be generated by analyzing all log files involved in process flow 705, and identifying connections between the log files using transaction IDs. For example, a connection can be identified based on back-end software modules. The query results can be visually represented as a flow diagram (e.g., a Sankey diagram) and shown as process flow 705, for example. In addition, querying can include obtaining a distinct list of transactions (e.g., log records) occurring or generating during the identified time interval (i.e., May 4, 2015, 10:00:00 PM to 10:59:59 PM). When the set of log records occurring during the interval or obtained, then a distinct list of log files (e.g., log sources) associated with the set of obtained log records can be generated. For example, a set of 5610 log records can be obtained, and the 5610 log records can be from five different log files. From the distinct list of log files, the individual log records can be connected based on time. For example, a particular transaction ID can be included in each of the log file corresponding to StepA and the log file corresponding to StepB. Because the transactions are sorted by time, the system can determine that the log record in StepA occurred first (e.g., at a login stage), and then the process flow (e.g., for a particular user) associated with the transaction ID proceeded to StepB (e.g., a validation page).

While the above description describes that log sources are connected using transaction IDs, it will be appreciated that the present disclosure is not limited to connecting log sources. It will be appreciated that any field in a log record can be connected using a unique flow key or combination of fields to generate a flow key (e.g., a user ID and a session ID may be a unique key). Further, the connection field can depend on the structure of the log records and the application or flow in which the log record is included. Additionally, while there can be many software modules in the system or business flow, there is typically a direction in which transactions flow. It will also be appreciated that new modules that are newly added or incorporated into a process flow can be automatically detected and represented in the visual representation of process flow 705. In addition, it will be appreciated that input field By 735 can be a drop-down list that is presented to a user. The drop-down list can include a list of fields, each of which corresponding to a unique flow key that can be used to connect or group log records between stages of the process flow. More than one field can be selected in the By 735 input field. For example, while the example of transaction ID is used above, a combination of fields can also be used as a flow key (e.g., host ID, user ID, session ID, etc.).

As shown in FIG. 7, process flow 705 can be a visual representation of the connections between log sources that were identified. For example, at StepA (e.g., a login page), 5610 transactions were identified. In this example, the number 5610 can represent that during the first stage of the process flow, a back-end software module generated 5610 log records (e.g., each log record including a unique transaction ID) during the identified time interval (i.e., May 4, 2015, 10:00:00 PM to 10:59:59 PM). Further, process flow 705 indicates that all of the 5610 unique transactions proceeded to StepB. Process flow 705 also illustrates that a portion of the 5610 unique transactions proceeded to StepD, another portion of the 5610 unique transactions proceeded to StepC, and lastly the remaining portion of the 5610 unique transactions proceeded to the "Fail" stage, indicating a failure or error occurring for those transactions.

In some embodiments, one unique flow key can be mapped to a different flow key as part of the same transaction in a process flow. For example, a process flow can include interactions with several sub-systems. One subsystem can use a unique ID (e.g., agent and data source), but when the transaction proceeds to another sub-system (e.g., an Oracle sub-system), a new unique ID can be generated, such that internal components use that new ID. It will be appreciated that while there are two unique IDs representing the same flow in a transaction, at least one log record may contain both unique IDs (e.g., a log record relating to the generation of the new unique ID and relation to the previous unique ID). For example, logic for mapping unique flow keys can include logic that swaps out the new unique ID for the previously-used unique ID for all log records remaining in the process flow (e.g., one log record uses unique ID A, another log record matches unique ID A to new unique ID B, and unique ID B can be swapped with unique ID A for all log records in the process flow).

As described above, a small portion of the 5610 proceeded from StepB to the "Fail" stage. For example, the "Fail" stage can represent instances where a log record associated with one stage could not be connected to another log record of another stage using the transaction ID flow key. In some embodiments, proceeding to the "Fail" stage could indicate an error or failure in the process flow. In some embodiments, proceeding to the "Fail" stage could indicate that the next stage did not occur in the present time interval (but rather in another, subsequent time interval). In these embodiments, the transactions (for which the next stage occurs in another time interval) can be labeled as "In Progress," for example.

In some embodiments, when a snapshot is taken (e.g., when all log records generated during a particular time interval are obtained), three transactions may be presented: 1) All of the transactions from StepA proceed to StepB; 2) a subset of transactions may not have proceeded to StepB during the time interval or may have failed (e.g., proceeded to "Fail" stage); and/or 3) The transaction has been completed and no next stage is intended (e.g., a final screen after a payment screen).

It will be appreciated that any field where values are being used to connect log messages can be used as a flow key. A flow key may be from different sources or log messages flagged with different types that are from the same source, depending on how the log mechanism is defined. In some cases, log systems could indicate that all data is coming from the same source, however, for a particular log record, (e.g., a notification log, transaction boundary log, etc.), the flow key that is being used to group or cluster data sets may be a key that can connects different sets of data together because the flow key is included in various log messages over time.

It will also be appreciated that the size of the band in process flow (e.g., the band representing 5610 transactions in StepA) can be sized to correspond to a magnitude of a number of log records included at that stage. For example, if 40 log records with unique transaction IDs are represented at StepA, then the band would be smaller than the band shown in FIG. 7.

In addition, timeline 645 can be an overview chart that represents all time intervals between the identified start time and end time. While the chart is represented as a line chart, the present disclosure is not limited thereto. For example, the chart type of timeline 745 can also be a bar chart. Further, timeline 745 can include different colors, such that each color represents a particular workflow shape (e.g., shape of the flow diagram or Sankey diagram), described hereinafter with respect to FIG. 8. Advantageously, interface 700 can clearly represent different shapes of workflows and at what time interval the shapes of workflows appeared. In addition, a time lapse of all time intervals can be presented in timeline 745. For example, a video can present the process flow (e.g., process flow 705) for each time interval in a sequential order. In this example, the visual representation of the process flow for each interval can be presented for a defined amount (e.g., 1000 milliseconds) of time before moving on to the next time interval.

It will be appreciated that, as the transactional flow pattern is derived for each time interval, a list of targets involved in the transactional flow pattern can also be determined. From the transactional flow pattern and the determined list of targets, a topology may be automatically derived and presented on interface 700.

Figure 8:
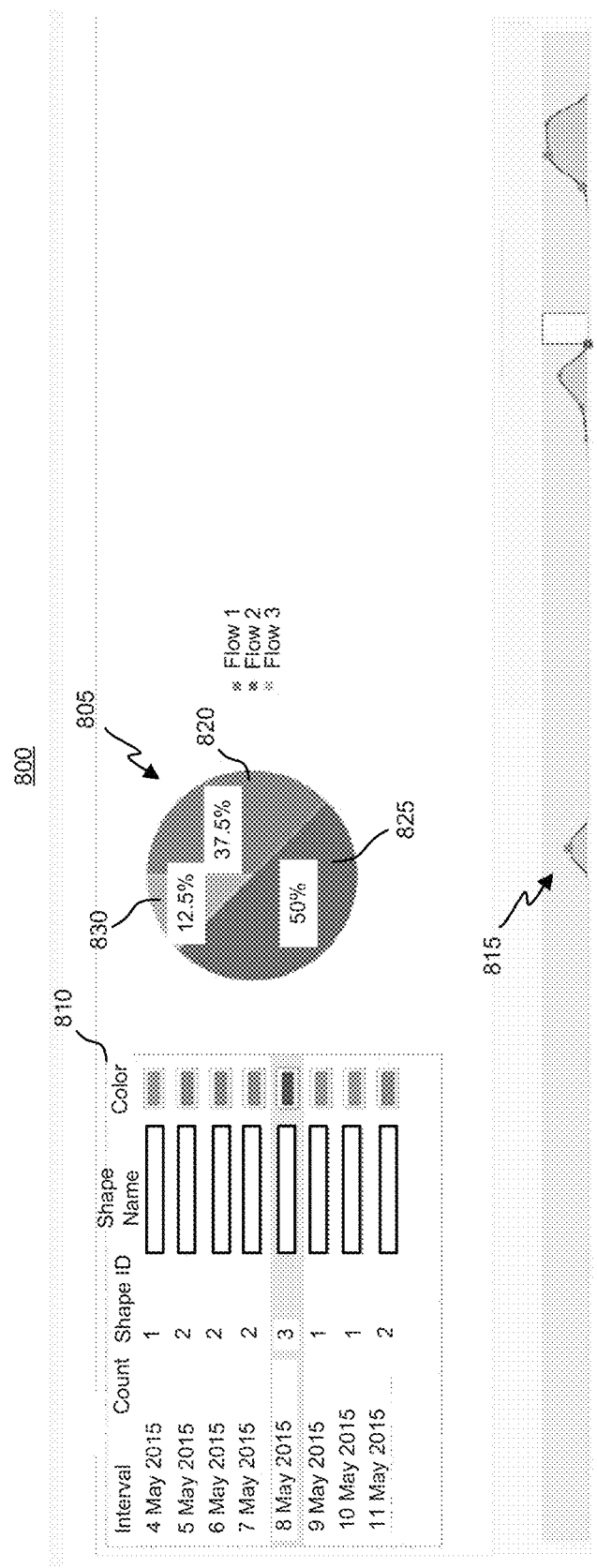
FIG. 8 is an example user interface according to certain embodiments of the present disclosure.

FIG. 8 shows an example presentation of an interface presented on a user device (e.g., an administrator device associated with an administrator). In some embodiments, interface 800 can include graphic 805 and table 810. While FIG. 8 illustrates graphic 805 as a pie chart, the present disclosure is not limited thereto, and thus, graphic 805 can be any type of diagram. Further, table 810 can include one or more columns. For example, the columns of table 810 can include "Interval" representing a time interval between the start time and end time (as selected in menu 710 of FIG. 7), "Count" representing the total number of transaction IDs in log records generated during the time interval, "Shape ID" representing an identifier (e.g., an integer, letter, or any other type of identifier), "Shape Name" representing a name associated with the shape, and "Color" representing a color associated with the shape. A shape can represent a particular flow characteristic, flow pattern, or transactional flow pattern.

In some embodiments, a shape can be represented by a data tree structure. For example, a data tree structure can include one or more nodes. A node can represent a stage of the process flow. Referring to process flow 705 of FIG. 7, the transactional flow pattern (e.g., shape) of process flow 705 can include a connection between each of node A (e.g., the stage of StepA) to node B (e.g., the stage of StepB), node B to node C (e.g., the stage of StepC), node B to node D (e.g., the stage of StepD), node B to node E (the "Fail" stage), and node C to D. Each distinct transactional flow pattern can be assigned an identifier, such that other intervals that are associated with process flows having the same transactional flow pattern are assigned the same identifier. For example, a first time interval has a first transactional flow pattern and a second time interval has a second transactional flow pattern. In this example, if the first transactional flow pattern is the same as the second transactional flow pattern, then the first and second transactional flow patterns will be grouped and assigned the same identifier. It will be appreciated that two transactional flow patterns can be groups (or clustered) when the two patterns have the same connection state (e.g., the same node connection structure), the same or similar number of transactions flowing into and out of each stage, or share any other suitable attribute.

In some embodiments, the percentages represented in sections 820, 825, and 830 of graphic 805 can represent the percentages of time intervals that have a particular flow characteristic (used interchangeably with a flow pattern or a transactional flow pattern). For example, section 825 is 50% of graphic 805 because four of the eight intervals listed in table 810 have a connection state ID of "2." Further, section 830 is 12.5% of graphic 805 because one of the eight intervals listed in table 810 has a connection state ID of "3." Lastly, section 820 is 37.5% of graphic 805 because three of the eight intervals listed in table 810 have a connection state ID of "1."

Advantageously, users can identify which time intervals between the start time and end time include transactions proceeding to the "Fail" stage. For example, graphic 805 can indicate what percentage of the time are connections broken (e.g., proceeding to the "Fail" stage), and which time intervals include a broken connection that ends at the "Fail" stage. In other words, graphic 805 indicates that 87.5% (i.e., 50% plus 37.5%) of log records appear in a time interval where there was a failure in that interval. In some embodiments, graphic 805 can represent a total number of transactions that proceeded to the "Fail" stage or an "in progress" stage (in graphic 805 or in another graphic presented next to graphic 805). Further, in some embodiments, clicking on a shape or section in graphic 805 can trigger a presentation of a table with log records filtered by failure type (e.g., filter by subsystem, host name, etc.). In some embodiments, graphic 805 can be presented in alternative views. In one embodiment, graphic 775 can be presented with a focus on time intervals. In another embodiment, graphic 805 can be presented with a focus on transactions or a number of transactions across all time intervals.

In some instances, the number of transactions (e.g., log records including a transaction ID) within a log file can be a subset of all log records of the log file (e.g., 20 million log records, but 2 million transactions, e.g., log records with transaction IDs). Further, log records with transaction IDs that are generated within one time interval, but that do not proceed to another stage until another time interval, can be represented as proceeding to an "in progress" stage.

Further, in some embodiments, when a transaction initially occurs in one time interval (e.g., login stage), but does not reach a completed stage (e.g., checkout stage) until another time interval, that transaction can be represented as a flow to an "in progress" stage. In other embodiments, a transaction can proceed to the "Fail" stage if there has been no log record associated with the transaction ID for a defined time period (e.g., a timeout period). In some embodiments, each stage of the process flow can represent any transactions that started (or alternatively, stopped) in that particular stage in this time interval. For example, the 5610 transactions of StepA can represent that 5610 transactions were generated during the StepA stage. In other embodiments, if a log record including a particular transaction ID was generated during an initial stage (e.g., StepA) during a particular time interval, then all other transactions associated with that particular transaction ID can be represented in that particular time interval, regardless of when other transactions including that transaction ID occurred.

In some embodiments, based on the set of log records, the average time for completing a transaction (e.g., from a login stage to a payment stage) can be determined. After the average time is determined, a recommended time interval can be presented to the user. The time interval can be recommended, such that the entire transaction is likely to be completed within the time interval based on the determined average time. In some embodiments, the user can adjust the recommended time interval or proceed to obtain a set of log records generated during the selected time interval.

In some embodiments, if a particular stage is to be investigated (e.g., a payment stage) by a user, the user may query for the set of log records generated during the particular stage (e.g., all log records indicating that a transaction has completed at the payment stage). In these embodiments, the visual representation can be keyed starting at the time when the first log record was generated from the log file (e.g., a checkout source). For example, the visual representation can be anchored by a module that was selected by a user. As further customization options for the visual representation, the time intervals can vary in length (e.g., the time intervals may or may not be uniform between the start time and end time). For example, the time intervals can be determined by being keyed off of a specific data source. It will be appreciated that interface 800 can also include a tab (not shown) for indicating a data throughput. Through the throughput tab, a time interval having a peak load or a non-peak, low load can be determined.

In some embodiments, interface 800 can also include timeline 815. Timeline 815 can be any type of graph (e.g., line graph, bar graph, etc.). In addition, timeline 815 can include dots of different colors, such that each color represents a particular transactional flow pattern. Further, it will be appreciated that each unique connection state (e.g., shape) can be assigned a particular color.

It will be appreciated that in some embodiments, the visual representation of a transactional flow pattern can be a directed acyclic graph. Further, after the vertexes and connections are gathered (e.g., nodes formed), an integer can be computed and assigned to each unique transactional flow pattern (e.g., shape), such that the same shapes are assigned the same identifier. When playing the video, several playback options can be available, including "pause where there is data," "pause at next non similar shape/transactional flow pattern," "pause at next similar transactional flow pattern," "pause at next possibly anomalous transactional flow patter, if any," and so on. It will be appreciated that the similarity between two connection states (e.g., shapes) can be determined based on an exact match of the shape of the transactional flow pattern (the way the nodes and edges are connected), the amount of throughput at each step (e.g., here, the amount of throughput at each step may not mean the connection states (e.g., shapes) are exactly equal, but they can be more or less equal), and so on.

FIG. 9 shows an example presentation of an interface presented at a user device (e.g., an administrator device associated with an administrator). In some embodiments, log records may not include a unique flow key which can be used to group two or more log records in different log files together. In these embodiments, interface 900 can be provided. Interface 900 can present the distribution of different values for a particular characteristic associated with log records of a particular log file. For example, interface 900 can be configured to receive an identification of a particular log source and/or a start time and end time based on user input.

Further, interface 900 can facilitate accessing the log records from the identified log source that were generated between the selected start time and end time. Interface 900 can also be configured to receive input corresponding to a selection of a time interval, which is used to split the time period between the selected start time and end time. A set of log records that satisfy the identified constraints (e.g., records generated between the start time and end time or generated during a particular time interval) are obtained. For example, bucket 905 can represent a total count of log records generated during a particular time interval. Interface 900 can enable a user to construct a query string to filter for a distribution of values associated with a particular characteristic. For example, interface 900 can receive an input corresponding to an identification of a field 'Machine Name' included in the log records. In this example, interface 900 can present buckets 910, which represent the distribution of different values of the characteristic of 'Machine Name.' In other words, FIG. 9 illustrates that of the 214 log records in bucket 905, 82 log records were generated on Machine A, 80 log records were generated on Machine B, and 52 log records were generated on Machine C. Accordingly, during the selected time interval, the distribution of different machines used included Machine A, Machine B, and Machine C, and thus, bucket 910 shows the distribution of the different values of the selected base characteristic (e.g., the 'Machine Name' field of a log record in the selected log source).

In addition, interface 900 can be configured to receive an input corresponding to a selection of sub-characteristics of the selected base characteristic. For example, a sub-characteristic can include any characteristic of the selected base characteristic. In the example illustrated in FIG. 9, the selected sub-characteristic is a severity associated with a machine (e.g., a server) executing a software module. When a sub-characteristic is selected, a filter can be added to the previously-generated query string, such that a distribution of values of the sub-characteristic can be determined for each different value of the base characteristic. For example, for each of Machines A, B, and C, the distribution of values of the severity can be determined. As shown in FIG. 9, bucket 915 represents the distribution of severity values for each of Machine A, B, and C. For example, the distribution of severity values for the 82 log records generated on Machine A includes 69 log records having a severity of "warning" and 13 log records having another severity value. Further, interface 900 can be configured to enable users to filter for additional sub-characteristics (e.g., a module generating the log record), as shown in bucket 920. Interface 900 can also be configured so that when a bucket is selected, interface 900 can direct the user to a table of log records included in the bucket. It will be appreciated that the height and width of the bucket can correspond to the number of log records included in the bucket. Further, in some embodiments, interface 900 can also include a timeline (e.g., a bar graph, a line graph, or any suitable graph) (not shown) that includes a timeline of log records between the selected start time and the selected end time.

Figure 10:
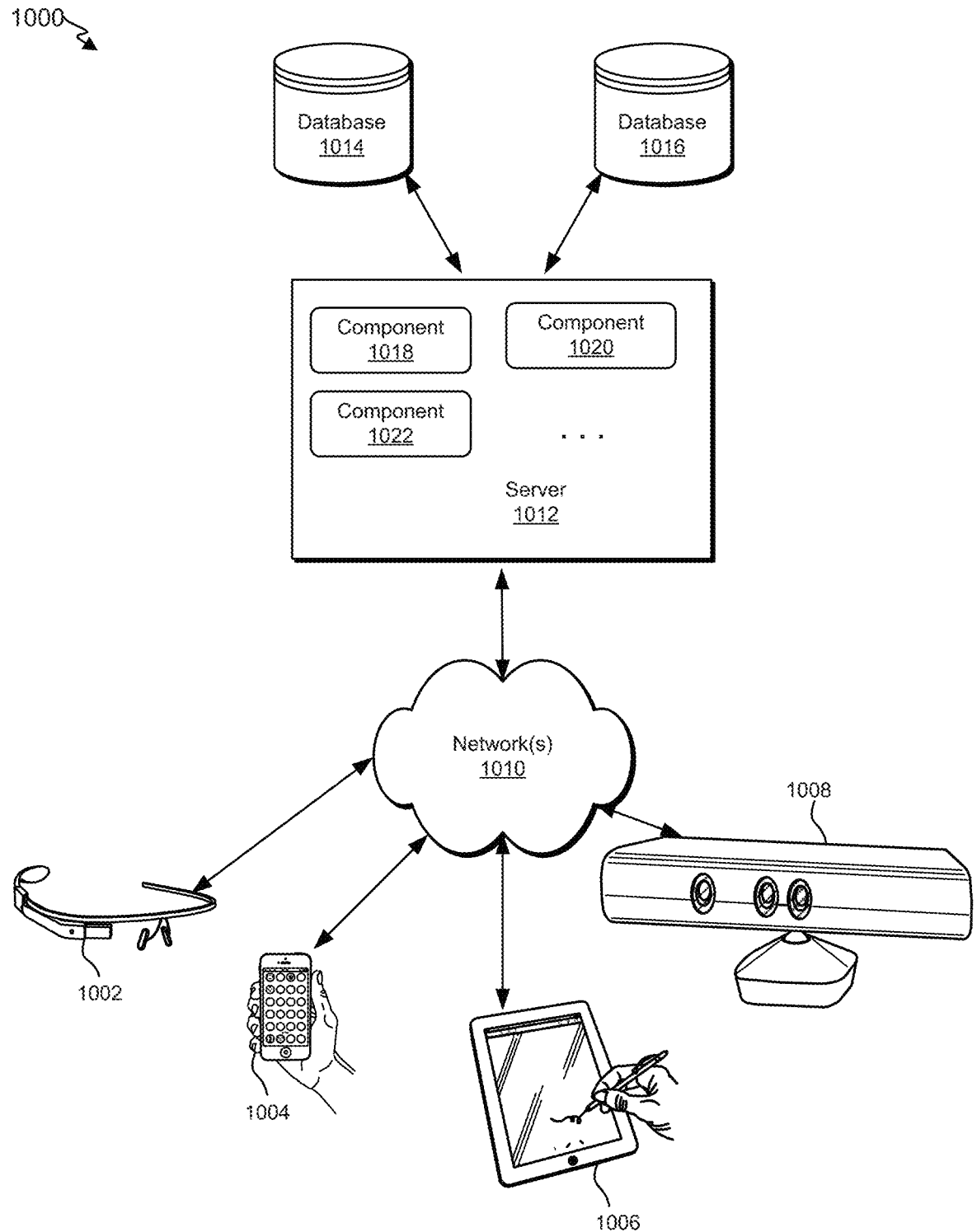
FIG. 10 depicts a simplified diagram of a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
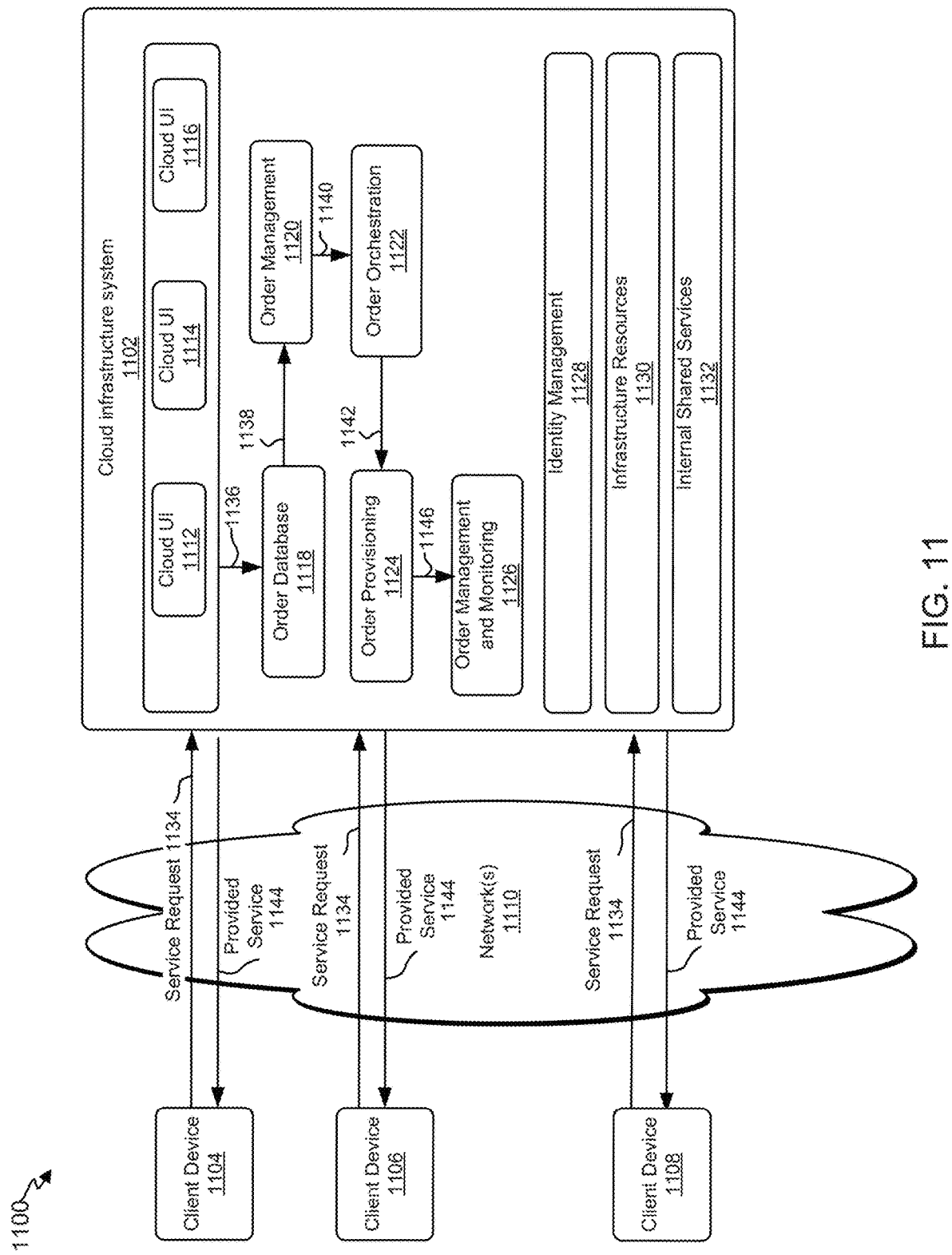
FIG. 11 is a simplified block diagram of one or more components of a system environment.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1102, 1104, 1106, and 1108.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1110.

Cloud infrastructure system 1102 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1102 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1012, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
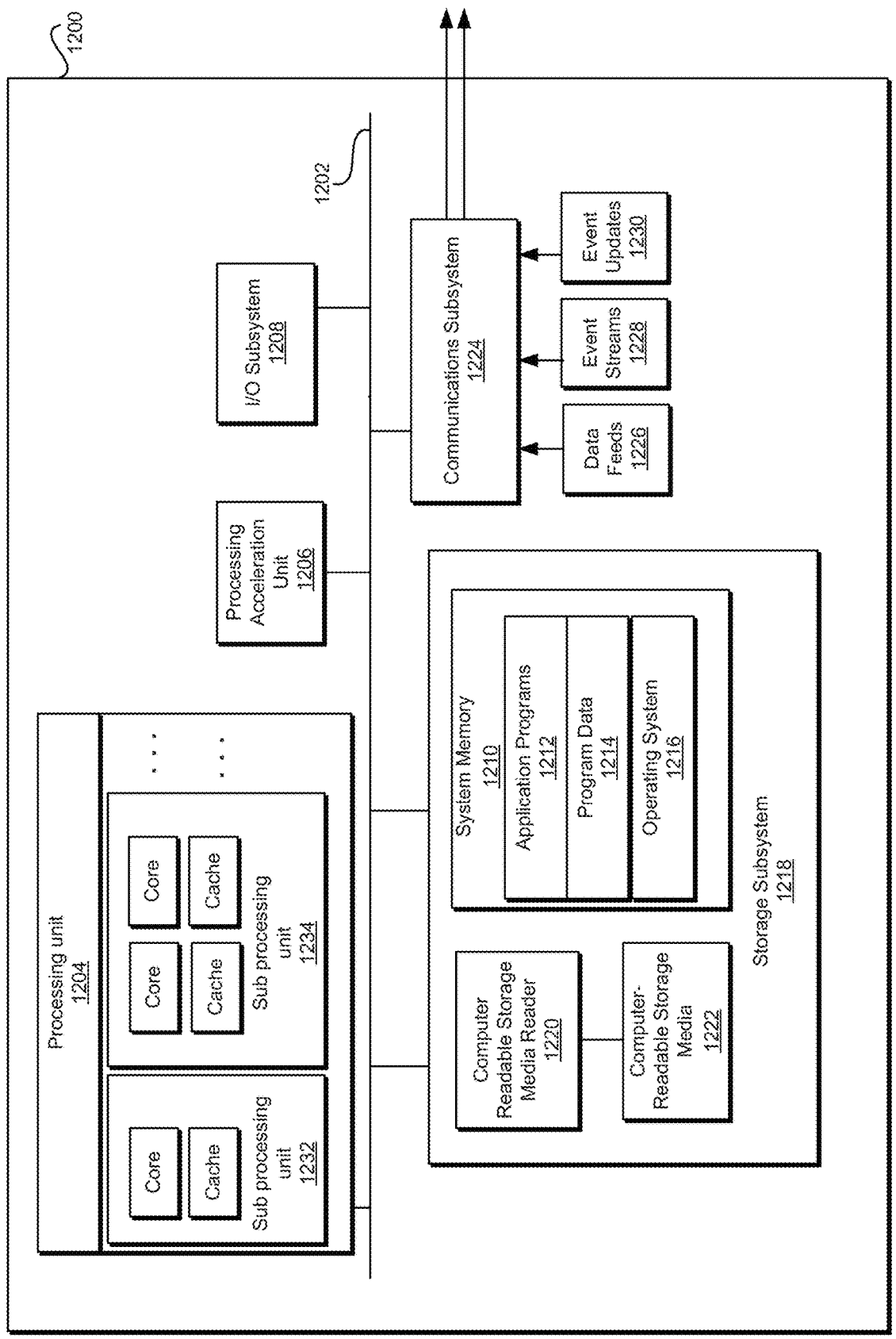
FIG. 12 illustrates an exemplary computer system, in which various embodiments of the present disclosure may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 908, a storage subsystem 918 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, the method comprising:
    receiving first input corresponding to a selection of a set of log messages;
    accessing the set of log messages based on the received first input, the set of log messages including a plurality of subsets of the set of log messages, and each subset of the set of log messages corresponding to a defined characteristic;
    receiving second input corresponding to a selection of a branching parameter configured to facilitate branching of one or more paths in a flow diagram representing a timeline of events captured within the set of log messages, wherein the branching parameter includes a plurality of defined characteristics and corresponds to a value of a data field include in each log message of the set of log messages, wherein the value indicates the defined characteristic of each log message;

determining a first bucket of the flow diagram, the first bucket including the set of log messages;

determining one or more second buckets of the flow diagram by, for each second bucket of the one or more second buckets:
  identifying a subset of the set of log messages that corresponds to a particular defined characteristic of the plurality of defined characteristics;
  identifying a particular value of one or more different values that corresponds to the particular defined characteristic and to the subset of the set of log messages; and
  populating a particular second bucket of the one or more second buckets with the subset of the set of log messages that corresponds to the particular value, wherein the particular value of the particular second bucket is different than a second particular value of a different second bucket of the one or more second buckets;

defining the one or more paths of the flow diagram, each of the one or more paths linking the first bucket to a second bucket of the one or more second buckets;

generating a graphical user interface (GUI) that includes a visual representation of at least a path of the one or more paths of the flow diagram visually and spatially connecting a visual representation of the first bucket to a visual representation of a second bucket of the one or more second buckets, wherein the visual representation of the path indicates a count of log messages associated with the second bucket, wherein at least one visual characteristic of each of the visual representations of the first bucket, the second bucket, and the path is generated based at least in part on the count of log messages associated with the second bucket, and wherein the GUI further includes a query builder that comprises a user interfaces;

displaying the graphical user interface including a dynamical generation of one or more visual representations of the one or more paths of the flow diagram and one or more input fields;

receiving one or more third inputs corresponding to a selection of a shape associated with one or more process flows and a modification of the shape; and in response to receiving the one or more third inputs, dynamically updating a back-end editable natural language query to correspond with the modification of the shape.

2. The computer-implemented method of claim 1, wherein the branching parameter corresponds to one or more flow keys configured to trigger linking a first log message in a first subset of the set of log messages to a second log message in a second subset of the set of log messages when each of the first and second log messages includes the one or more flow keys.

3. The computer-implemented method of claim 2, wherein, for each subset of the set of log messages:
  defining the one or more paths from the subset to one or more other subsets of the plurality of subsets based on the one or more flow keys, wherein each path of the one or more paths is between two subsets.

4. The computer-implemented method of claim 1, wherein the set of log messages includes log messages from a plurality of log sources.

5. The computer-implemented method of claim 1, wherein the set of log messages corresponds to a single log source.

6. The computer-implemented method of claim 5, further comprising:
  constructing a first query string based on the branching parameter; and
  performing a first query based on the first query string, the performing of the first query including:
  filtering the set of log messages using the branching parameter, such that the set of log messages are grouped into one or more buckets based on a distribution of values of the branching parameter, and such that a bucket corresponds to a particular value of the branching parameter and a subset of the set of log messages having the corresponding particular value.

7. The computer-implemented method of claim 1, wherein displaying the GUI further comprises:
a first visual representation including a flow represented by the first bucket that connects visually and spatially to one or more visual representations of second buckets, the first bucket representing a count of all log messages that are included in a segment, and the one or more second buckets representing a distribution of values of the branching parameter, such that each of the one or more second buckets corresponds to a particular value of the branching parameter and represents a count of all log messages that are associated with the particular value of the branching parameter.

8. A system, comprising:
one or more processors; and
a non-transitory computer-readable storage medium containing instructions which, when executed on the one or more processors, cause the one or more processors to perform operations including:
receiving first input corresponding to a selection of a set of log messages;
accessing the set of log messages based on the received first input, the set of log messages including a plurality of subsets of the set of log messages, and each subset of the set of log messages corresponding to a defined characteristic;
receiving second input corresponding to a selection of a branching parameter configured to facilitate branching of one or more paths in a flow diagram representing a timeline of events captured within the set of log messages, wherein the branching parameter includes a plurality of defined characteristics and corresponds to a value of a data field include in each log message of the set of log messages, wherein the value indicates the defined characteristic of each log message;
determining a first bucket of the flow diagram, the first bucket including the set of log messages;
determining one or more second buckets of the flow diagram by, for each second bucket of the one or more second buckets:
  identifying a subset of the set of log messages that corresponds to a particular defined characteristic of the plurality of defined characteristics;
  identifying a particular value of one or more different values that corresponds to the particular defined characteristic and to the subset of the set of log messages; and populating a particular second bucket of the one or more second buckets with the subset of the set of log messages that corresponds to the particular value, wherein the particular value of the particular second bucket is different than a second particular value of a different second bucket of the one or more second buckets;

defining the one or more paths of the flow diagram, each of the one or more paths linking the first bucket to a second bucket of the one or more second buckets;

generating a graphical user interface (GUI) that includes a visual representation of at least a path of the one or more paths of the flow diagram visually and spatially connecting a visual representation of the first bucket to a visual representation of a second bucket of the one or more second buckets, wherein the visual representation of the path indicates a count of log messages associated with the second bucket, and wherein at least one visual characteristic of each of the visual representations of the first bucket, the second bucket, the path is generated based at least in part on the count of log messages associated with the second bucket, and wherein the GUI further includes a query builder that comprises a user interface; and displaying the graphical user interface including a dynamical generation of one or more visual representations of the one or more paths of the flow diagram and one or more input fields;

receiving one or more third inputs corresponding to a selection of a shape associated with one or more process flows and a modification of the shape; and in response to receiving the one or more third inputs, dynamically updating a back-end editable natural language query to correspond with the modification of the shape.

9. The system of claim 8, wherein the branching parameter corresponds to one or more flow keys configured to trigger linking a first log message in a first subset of the set of log messages to a second log message in a second subset of the set of log messages when each of the first and second log messages includes the one or more flow keys.

10. The system of claim 9, wherein, for each subset of the set of log messages:

defining the one or more paths from the subset to one or more other subsets of the plurality of subsets based on the one or more flow keys, wherein each path of the one or more paths is between two subsets.

11. The system of claim 8, wherein the set of log messages includes log messages from a plurality of log sources.

12. The system of claim 8, wherein the set of log messages corresponds to a single log source.

13. The system of claim 12, further comprising:

constructing a first query string based on the branching parameter; and performing a first query based on the first query string, the performing of the first query including:

filtering the set of log messages using the branching parameter, such that the set of log messages are grouped into one or more buckets based on a distribution of values of the branching parameter, and such that a bucket corresponds to a particular value of the branching parameter and a subset of the set of log messages having the corresponding particular value.

14. The system of claim 8, wherein displaying the GUI further comprises:

a first visual representation including a flow represented by the first bucket that connects visually and spatially to one or more visual representations of second buckets, the first bucket representing a count of all log messages that are included in a segment, and the one or more second buckets representing a distribution of values of the branching parameter, such that each of the one or more second buckets corresponds to a particular value of the branching parameter and represents a count of all log messages that are associated with the particular value of the branching parameter.

15. A computer-program product tangibly embodied in a non-transitory machine-readable storage medium, including instructions configured to cause a data processing apparatus to perform operations including:

receiving first input corresponding to a selection of a set of log messages;

accessing the set of log messages based on the received first input, the set of log messages including a plurality of subsets of the set of log messages, and each subset of the set of log messages corresponding to a defined characteristic;

receiving second input corresponding to a selection of a branching parameter configured to facilitate branching of one or more paths in a flow diagram representing a timeline of events captured within the set of log messages, wherein the branching parameter includes a plurality of defined characteristics and corresponds to a value of a data field included in each log message of the set of log messages, wherein the value indicates the defined characteristic of each log message;

determining a first bucket of the flow diagram, the first bucket including the set of log messages;

determining one or more second buckets of the flow diagram by, for each second bucket of the one or more second buckets:

identifying a subset of the set of log messages that corresponds to a particular defined characteristic of the plurality of defined characteristics;

identifying a particular value of one or more different values that corresponds to the particular defined characteristic and to the subset of the set of log messages; and populating a particular second bucket of the one or more second buckets with the subset of the set of log messages that corresponds to the particular value, wherein the particular value of the particular second bucket is different than a second particular value of a different second bucket of the one or more second buckets;

defining the one or more paths of the flow diagram, each of the one or more paths linking the first bucket to a second bucket of the one or more second buckets;

generating a graphical user interface (GUI) that includes a visual representation of at least a path of the one or more paths of the flow diagram visually and spatially connecting a visual representation of the first bucket to a visual representation of a second bucket of the one or more second buckets, wherein the visual representation of the path indicates a count of log messages associated with the second bucket, wherein at least one visual characteristic of each of the visual representations of the first bucket, the second bucket, and the path is generated based at least in part on the count of log messages associated with the second bucket, and wherein the GUI further includes a query builder that comprises a user interfaces;

displaying the graphical user interface including a dynamical generation of one or more visual representations of the one or more paths of the flow diagram and one or more input fields;

receiving one or more third inputs corresponding to a selection of a shape associated with one or more process flows and a modification of the shape; and in response to receiving the one or more third inputs, dynamically updating a back-end editable natural language query to correspond with the modification of the shape.

16. The computer-program product of claim 15, wherein the branching parameter corresponds to one or more flow keys configured to trigger linking a first log message in a first subset of the set of log messages to a second log message in a second subset of the set of log messages when each of the first and second log messages includes the one or more flow keys.

17. The computer-program product of claim 16, wherein, for each subset of the set of log messages:

defining the one or more paths from the subset to one or more other subsets of the plurality of subsets based on the one or more flow keys, wherein each path of the one or more paths is between two subsets.

18. The computer-implemented method of claim 1, wherein the at least one visual characteristic is a size of the visual representations of the first bucket, second bucket and the path, and the size of the visual representations are proportional to a particular count of log messages of one or more counts of log messages.

19. The computer-implemented method of claim 1, wherein the graphical user interface further includes a visual representation of an extended timeline, the extended timeline comprising a time window corresponding to visual representation of each of the one or more paths of the flow diagram.

20. The computer-implemented method of claim 1, wherein the GUI comprises a Sankey diagram comprising visual representations of each path of the one or more paths of the flow diagram.

21. The computer-implemented method of claim 1, further includes:

receiving one or more new log messages that have not been labeled;

feeding the one or more new log messages into a machine-learning computational model trained on historical log messages patterns to compare anew shape associated with the one or more new log messages to an existing shape associated with the one or more process flows, wherein the existing shape includes a failure stage; and predictively determining, based on one or more matched shapes, whether the one or more new log messages indicate a potential failure stage within a new process flow associated with the one or more new log messages.

* * * * *

UNITED STATES PATENT AND TRADEMARK OFFICE
CERTIFICATE OF CORRECTION

PATENT NO. : 12,014,283 B2
APPLICATION NO. : 15/610388
DATED : June 18, 2024
INVENTOR(S) : Yoon et al.

It is certified that error appears in the above-identified patent and that said Letters Patent is hereby corrected as shown below:

On the Title Page

Column 1, under item (73) Assignee, Line 2, delete "Shores (CA)" and insert -- Shores, CA (US) --, therefor.

On page 2, Column 2, under item (56) Other Publications, Line 36, delete "Softw are," and insert -- Software, --, therefor.

In the Specification

In Column 6, Line 44, delete "Ill" and insert -- 111 --, therefor.

In Column 16, Line 7, delete "the a" and insert -- the --, therefor.

In Column 27, Line 30, delete "Electronics" and insert -- Electronics Engineers --, therefor.

In the Claims

In Column 37, Line 5, in Claim 1, delete "include" and insert -- included --, therefor.

In Column 37, Line 43, in Claim 1, delete "interfaces;" and insert -- interface; --, therefor.

In Column 38, Line 53, in Claim 8, delete "include" and insert -- included --, therefor.

In Column 40, Line 67, in Claim 15, delete "interfaces;" and insert -- interface; --, therefor.

In Column 42, Line 20, in Claim 21, delete "anew" and insert -- a new --, therefor.

Signed and Sealed this
First Day of October, 2024

Katherine Kelly Vidal
*Director of the United States Patent and Trademark Office*